US012422447B2

United States Patent
Yamaguchi et al.

(10) Patent No.: US 12,422,447 B2
(45) Date of Patent: Sep. 23, 2025

(54) CONNECTION DEVICE AND AUTOMATED SYSTEM FOR INSPECTING SPECIMEN

(71) Applicant: Hitachi High-Tech Corporation, Tokyo (JP)

(72) Inventors: Shigeki Yamaguchi, Tokyo (JP); Masashi Endo, Tokyo (JP); Taichiro Yamashita, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 356 days.

(21) Appl. No.: 17/768,736

(22) PCT Filed: Oct. 21, 2020

(86) PCT No.: PCT/JP2020/039530
§ 371 (c)(1),
(2) Date: Apr. 13, 2022

(87) PCT Pub. No.: WO2021/085264
PCT Pub. Date: May 6, 2021

(65) Prior Publication Data
US 2024/0142479 A1     May 2, 2024

(30) Foreign Application Priority Data
Oct. 31, 2019   (JP) .................................. 2019-198073

(51) Int. Cl.
*G01N 35/02*     (2006.01)
*G01N 35/00*     (2006.01)
(Continued)

(52) U.S. Cl.
CPC ..... *G01N 35/025* (2013.01); *G01N 35/00584* (2013.01); *G01N 35/04* (2013.01);
(Continued)

(58) Field of Classification Search
CPC ........... G01N 35/025; G01N 35/00584; G01N 35/04; G01N 35/1081; G01N 2035/0412;
(Continued)

(56) References Cited

U.S. PATENT DOCUMENTS

2008/0271546 A1   11/2008   Miller et al.
2016/0030952 A1*  2/2016    Yarina ....................... B04B 9/02
                                                                    435/5
(Continued)

FOREIGN PATENT DOCUMENTS

JP       2010-526289 A     7/2010
JP       2015-152406 A     8/2015
(Continued)

OTHER PUBLICATIONS

International Search Report (PCT/ISA/210) issued in PCT Application No. PCT/JP2020/039530 dated Dec. 15, 2020 with English translation (four (4) pages).
(Continued)

*Primary Examiner* — Maris R Kessel
*Assistant Examiner* — May Leung Chiu
(74) *Attorney, Agent, or Firm* — Crowell & Moring LLP

(57) ABSTRACT

Provided are: a connection device with which it is possible to improve the degree of freedom in positioning of an analysis device that analyzes a specimen; and an automated system for inspecting a specimen, the system comprising the connection device. A connection device for connecting a specimen transport device that transports a specimen container in which a specimen is accommodated and an analysis device that analyzes the specimen, the connection device being characterized by comprising: a carousel that transports a specimen carrier, on which the specimen container is placed, during a prescribed interval; a grip part positioned inside the carousel, the grip part gripping the specimen
(Continued)

container at a specimen collection position, which is a position at which the specimen is collected; and a housing that covers the carousel, the connection device also being characterized in that the specimen collection position is above the transport path of the carousel and is positioned within a prescribed distance from the housing.

8 Claims, 20 Drawing Sheets

(51) Int. Cl.
     *G01N 35/04*     (2006.01)
     *G01N 35/10*     (2006.01)
(52) U.S. Cl.
     CPC . *G01N 35/1081* (2013.01); *G01N 2035/0412* (2013.01); *G01N 2035/0441* (2013.01); *G01N 2035/0462* (2013.01); *G01N 2035/0465* (2013.01)
(58) Field of Classification Search
     CPC ... G01N 2035/0441; G01N 2035/0462; G01N 2035/0465; G01N 2035/00306; G01N 35/0099; G01N 2035/0467
     See application file for complete search history.

(56) References Cited

U.S. PATENT DOCUMENTS

| | | |
|---|---|---|
| 2016/0334431 A1 | 11/2016 | Noda et al. |
| 2017/0212139 A1 | 7/2017 | Jaeggi |
| 2017/0269112 A1* | 9/2017 | Gerstel .............. G01N 35/1079 |

FOREIGN PATENT DOCUMENTS

| | | |
|---|---|---|
| JP | 2017-129576 A | 7/2017 |
| WO | WO 2015/111526 A1 | 7/2015 |

OTHER PUBLICATIONS

Japanese-language Written Opinion (PCT/ISA/237) issued in PCT Application No. PCT/JP2020/039530 dated Dec. 15, 2020 (four (4) pages).

Japanese-language International Preliminary Report on Patentability (PCT/IPEA/409) issued in PCT Application No. PCT/JP2020/039530 dated Aug. 10, 2021 (eight (8) pages).

* cited by examiner

[FIG. 1]
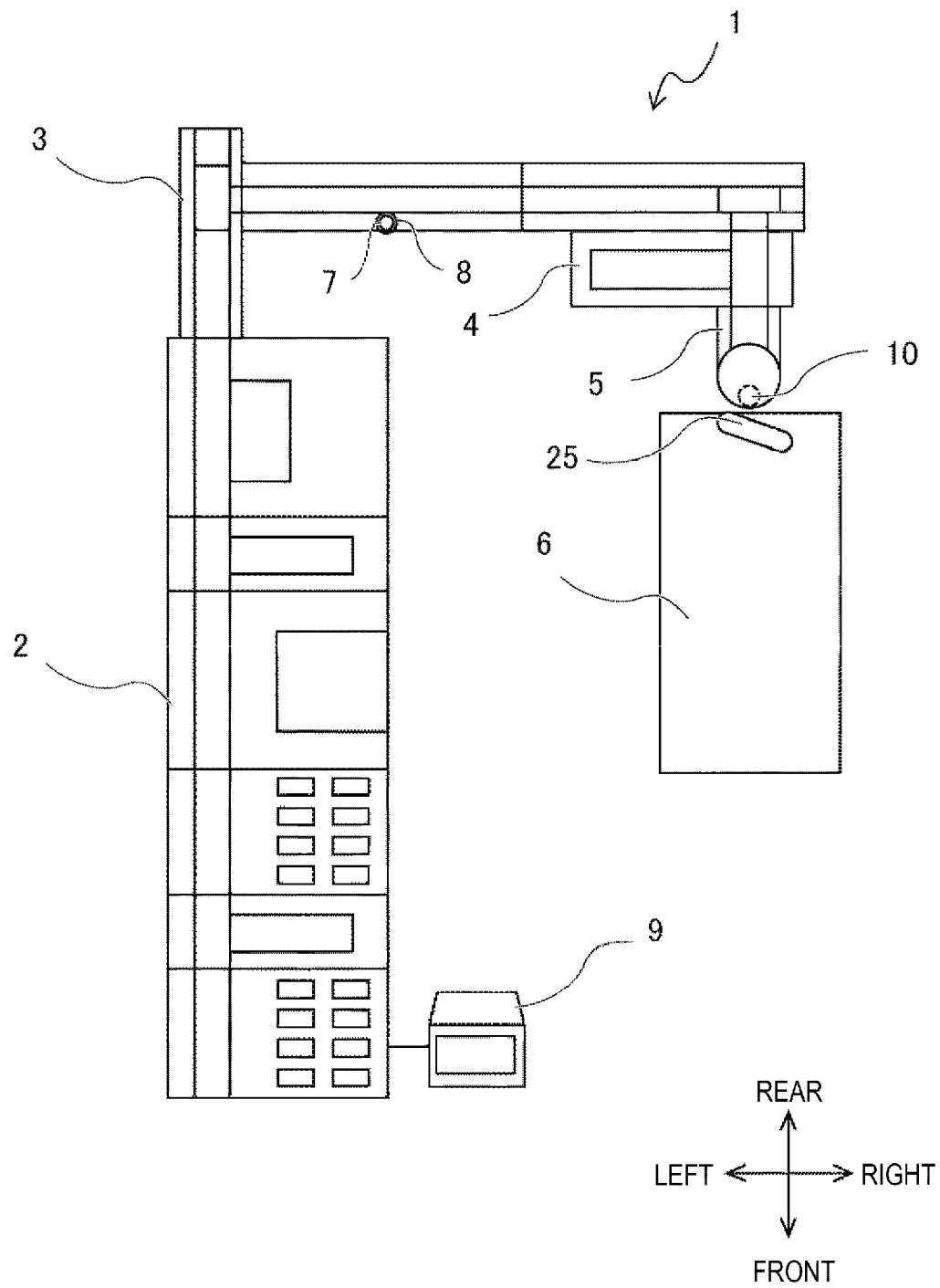

[FIG. 2]
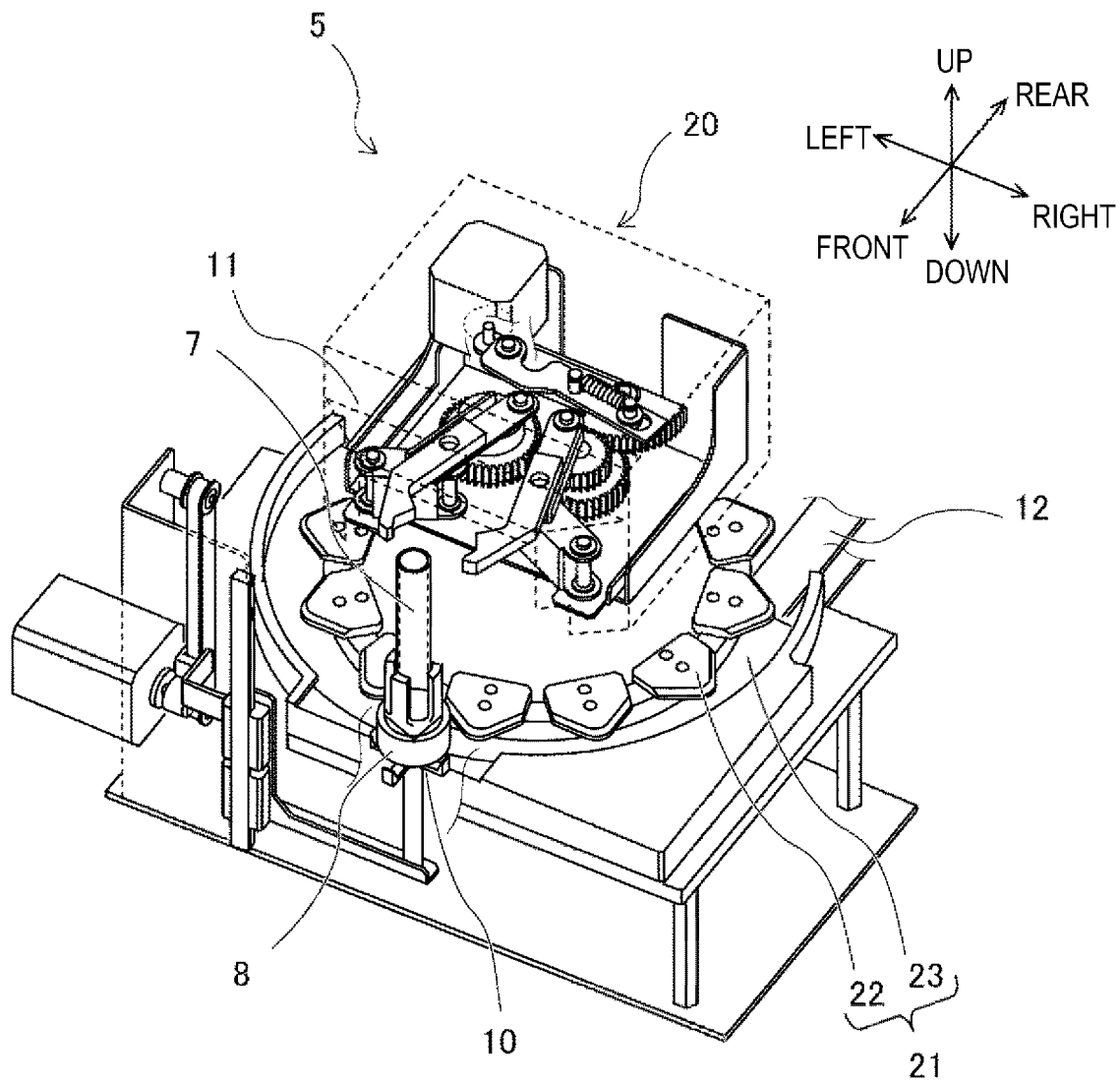

[FIG. 3]
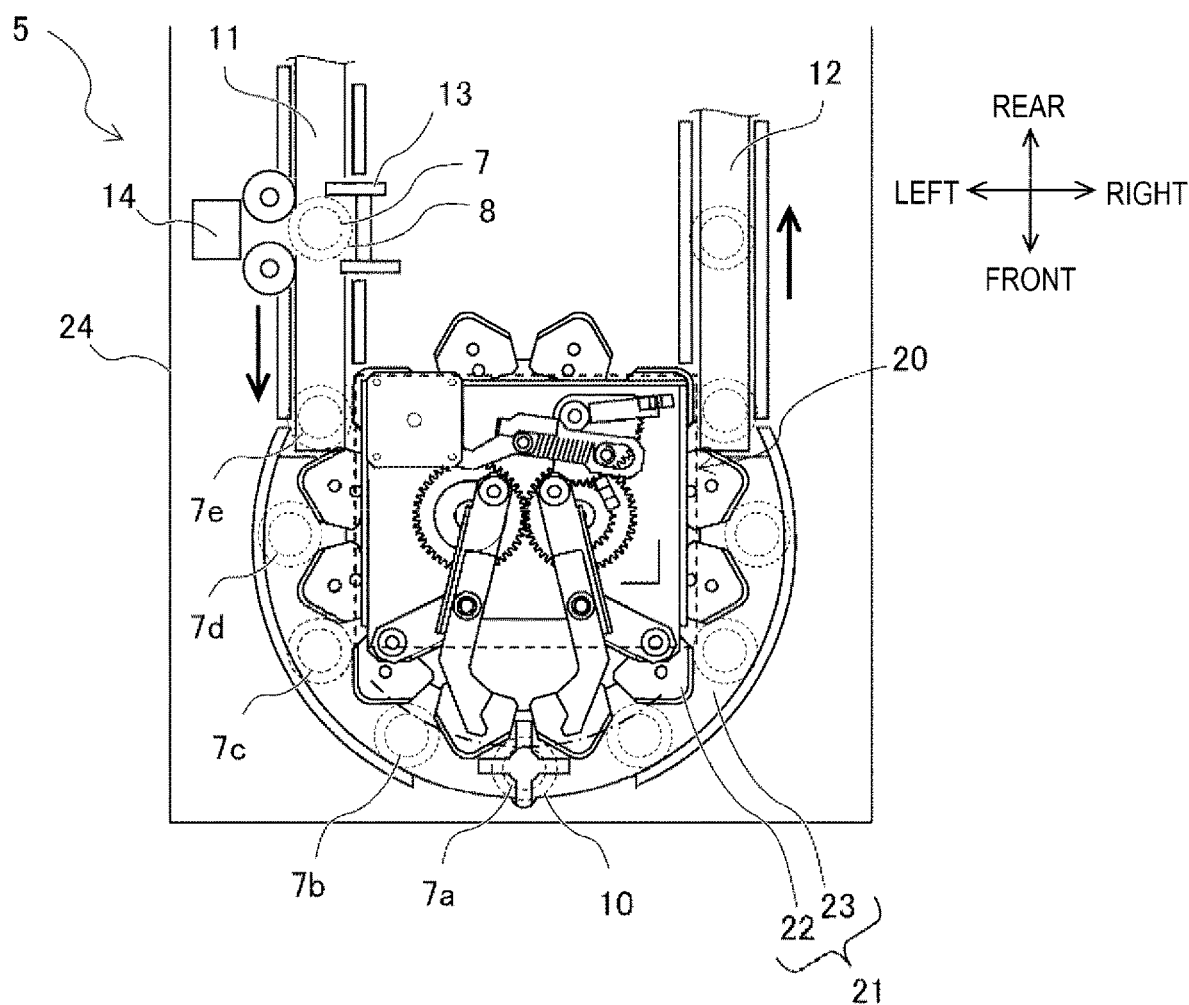

[FIG. 4]
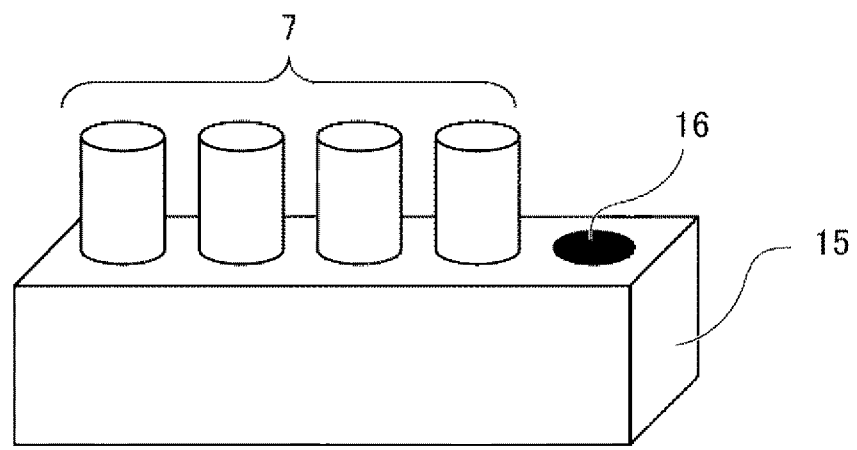

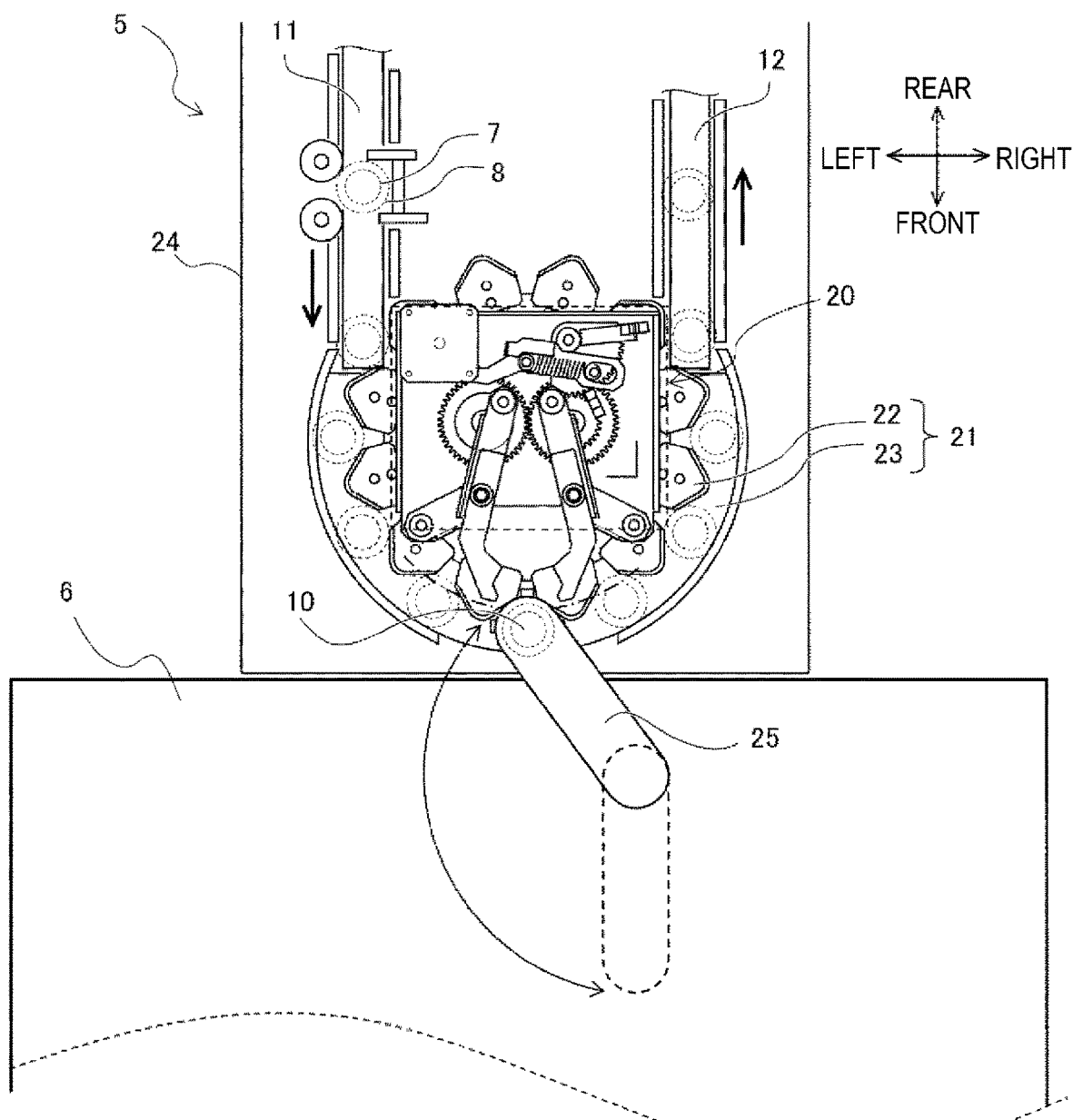
[FIG. 5]

[FIG. 6]
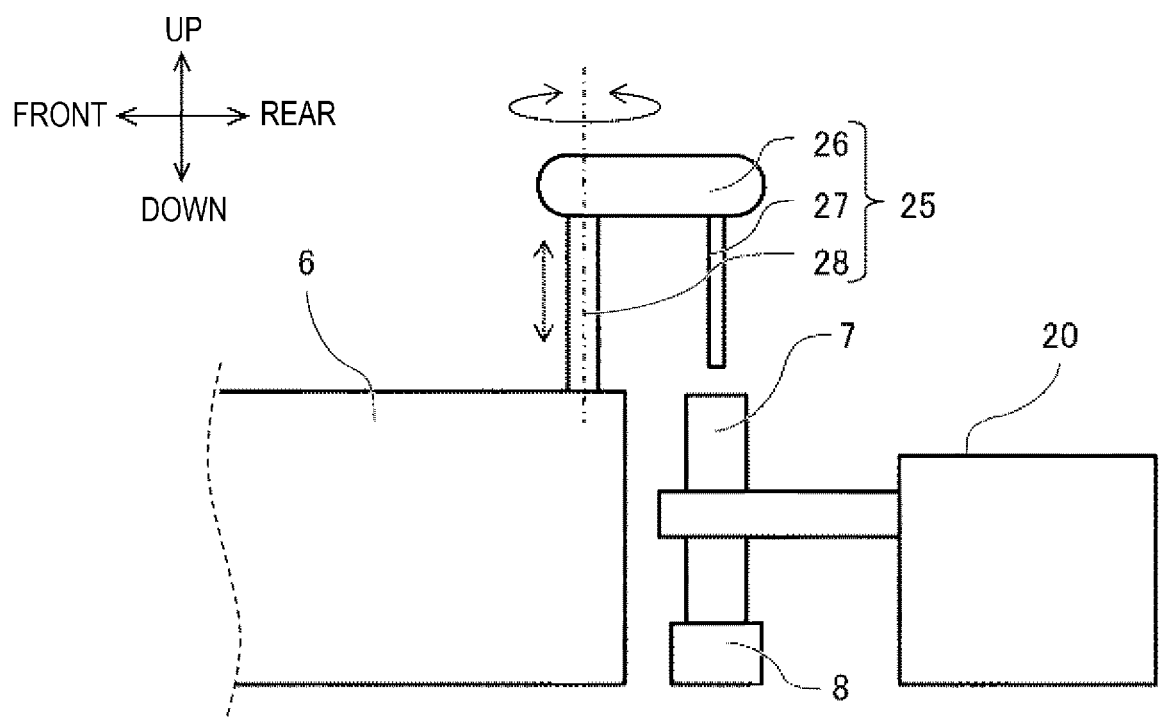

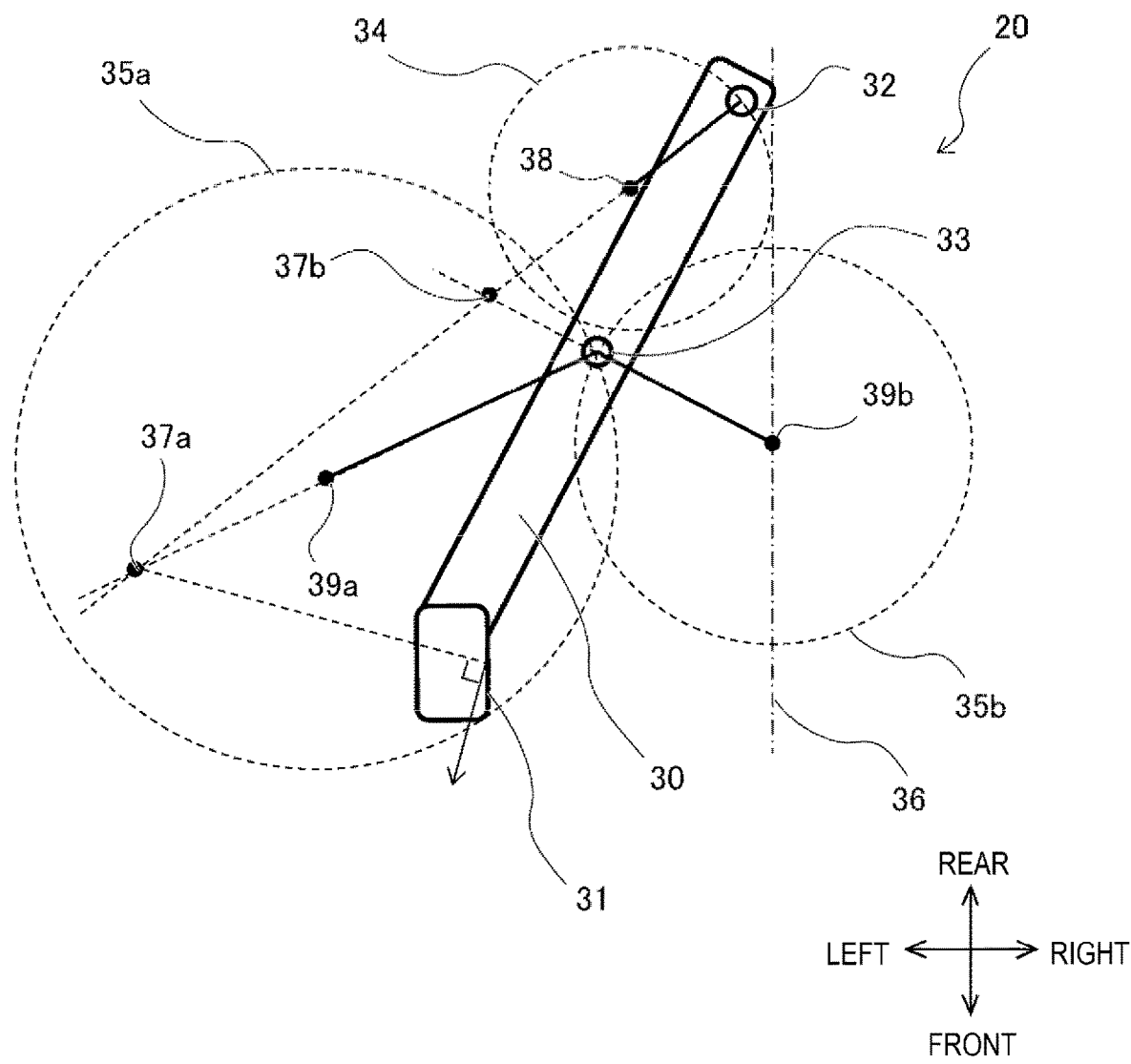
[FIG. 7]

[FIG. 8]
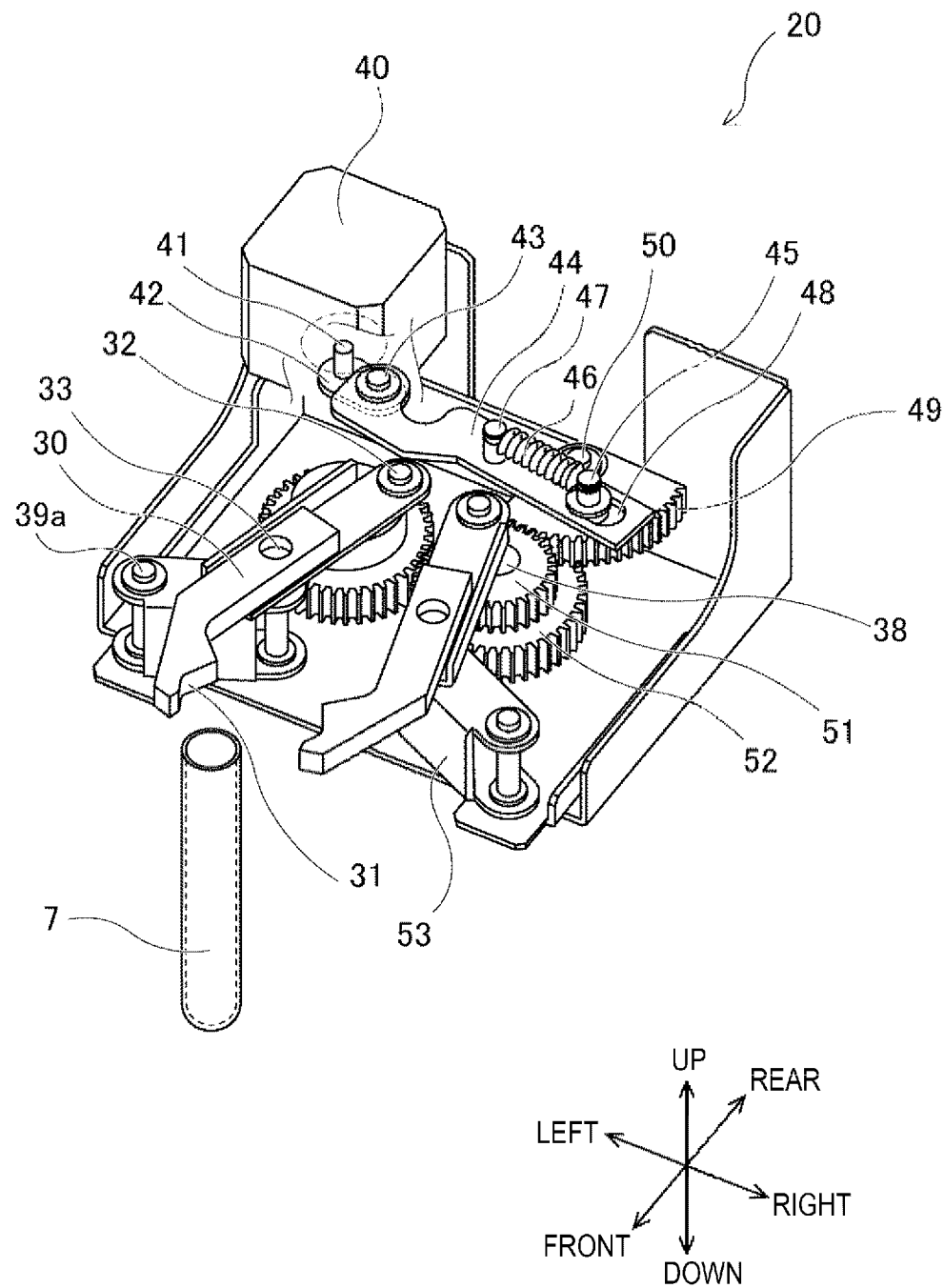

[FIG. 9]
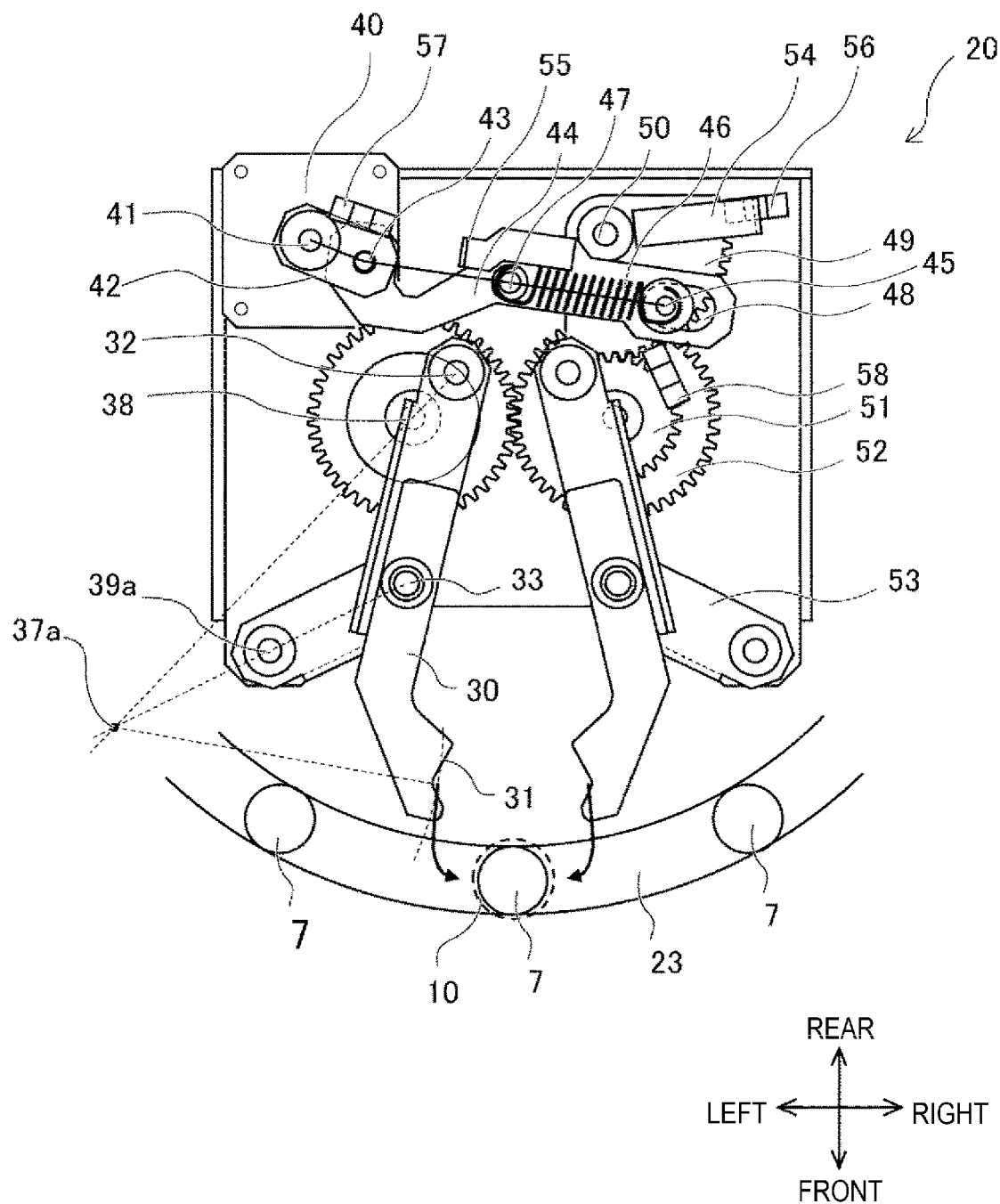

[FIG. 10]
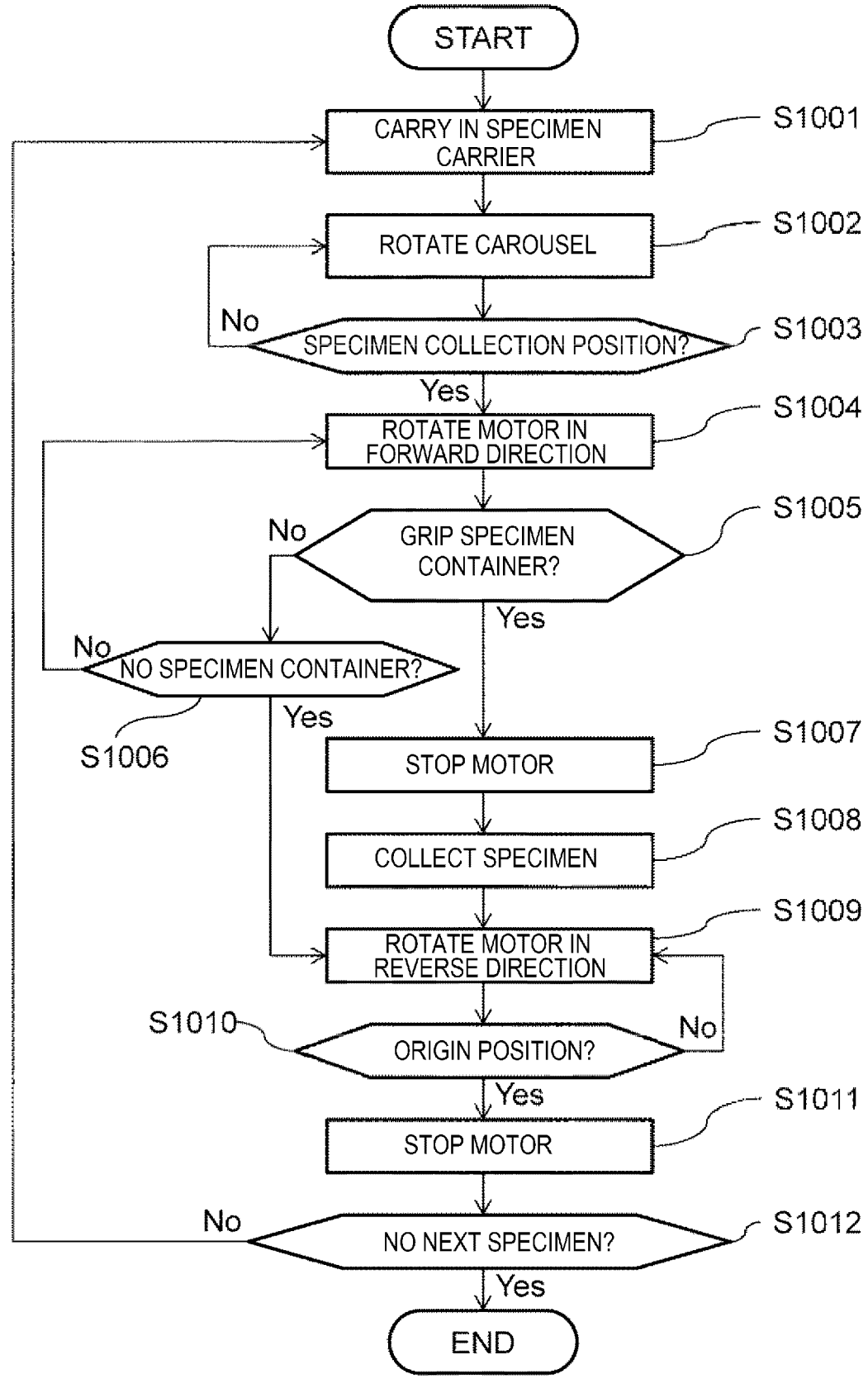

[FIG. 11]
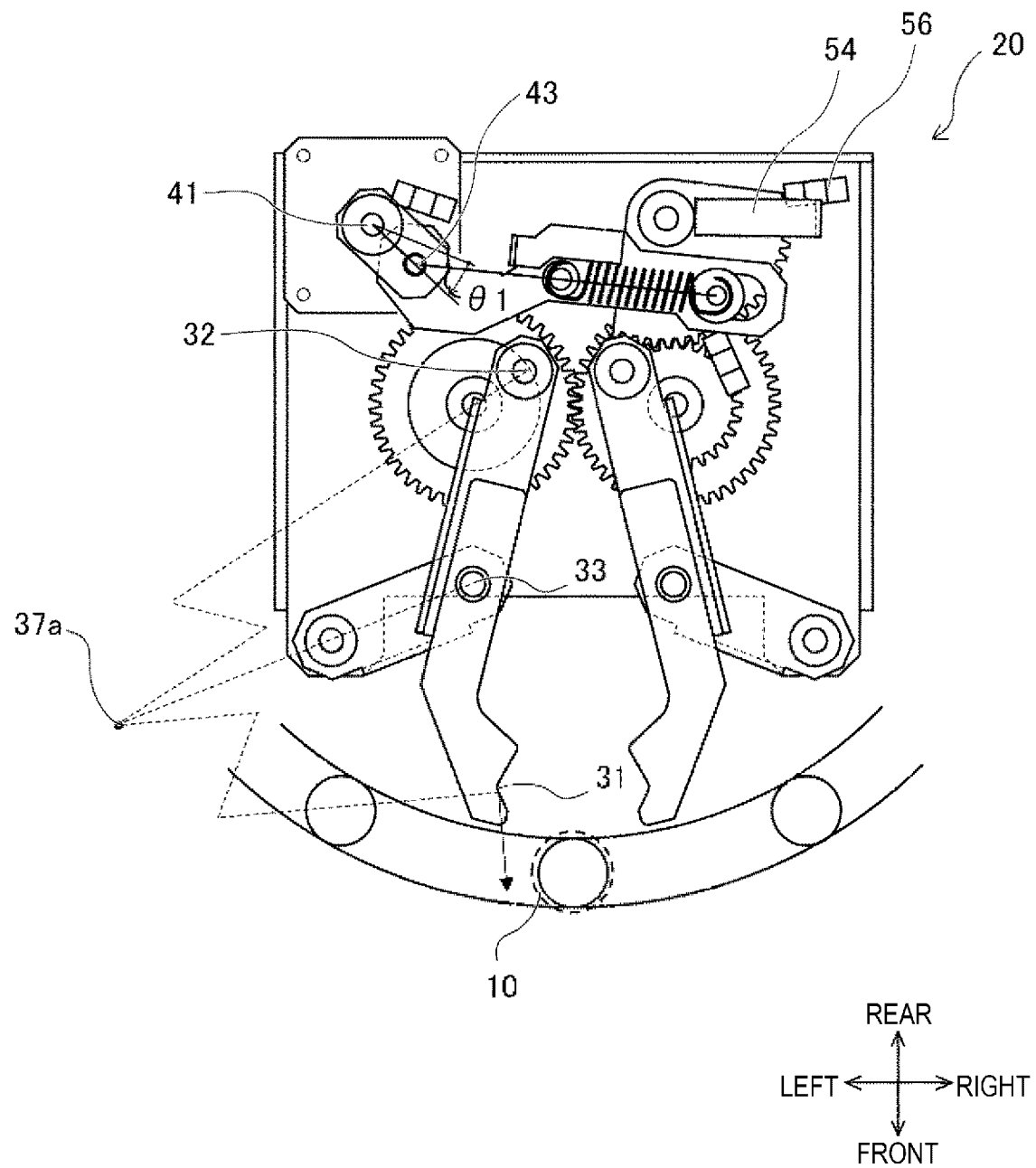

[FIG. 12]
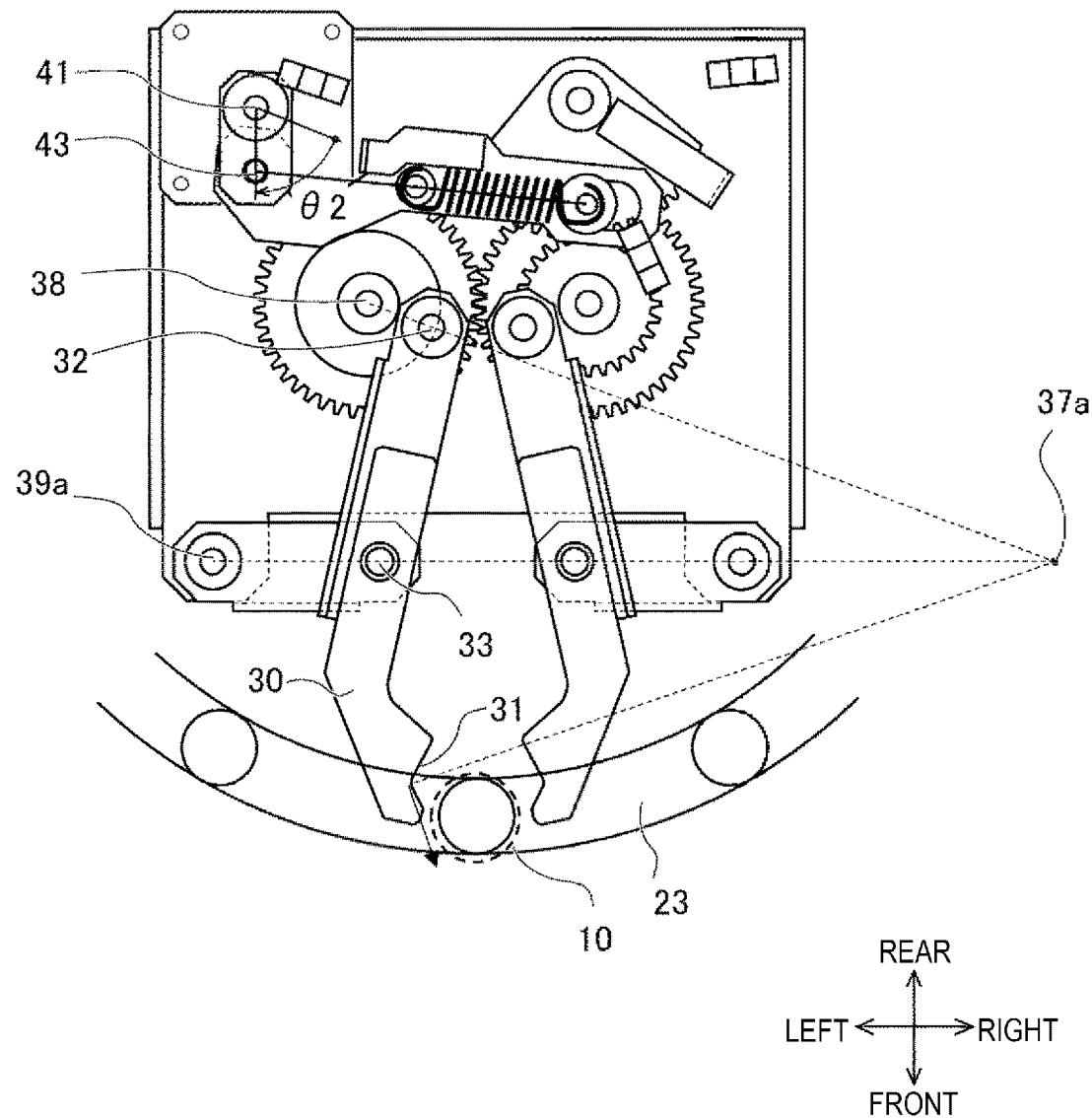

[FIG. 13]
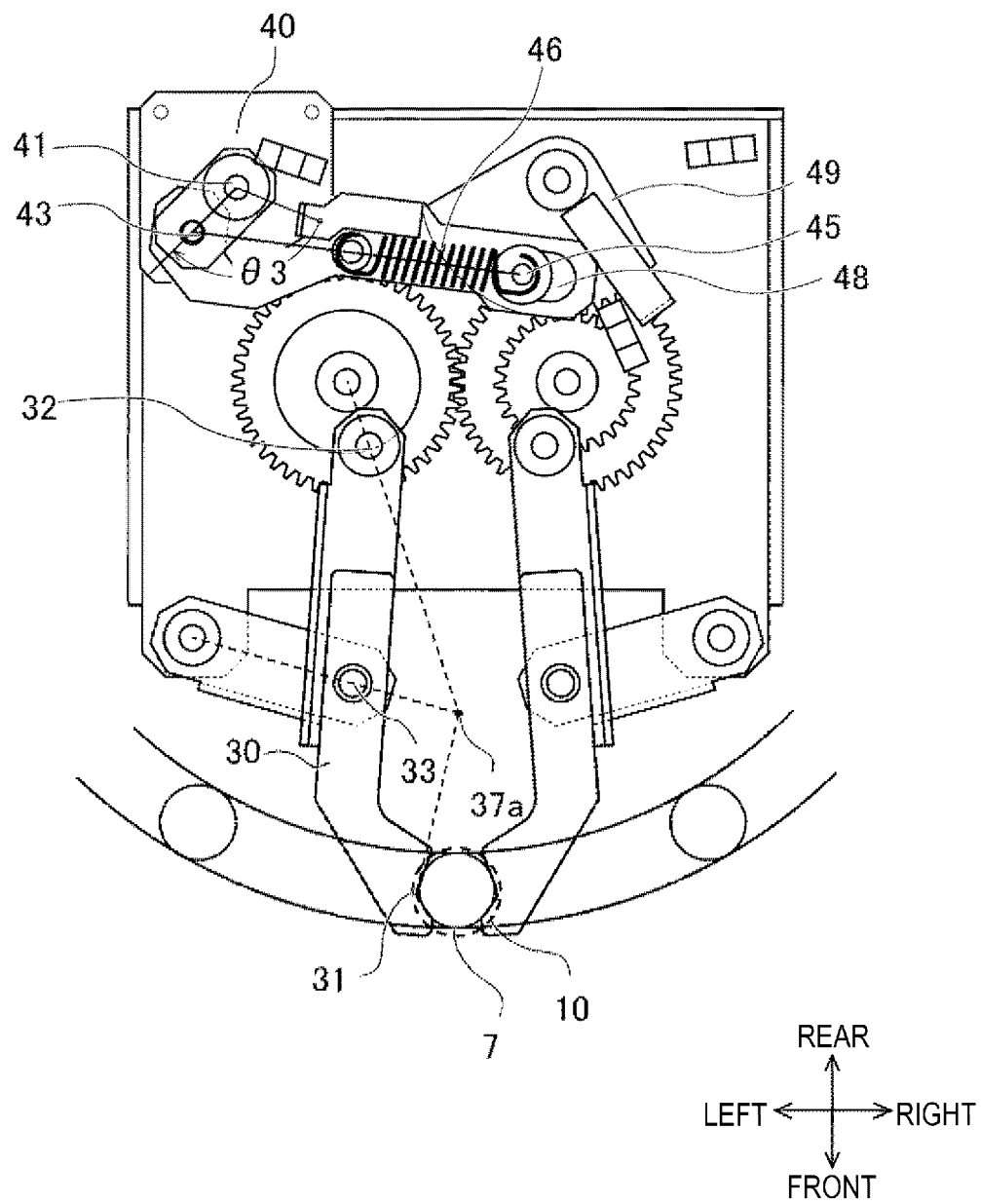

[FIG. 14]
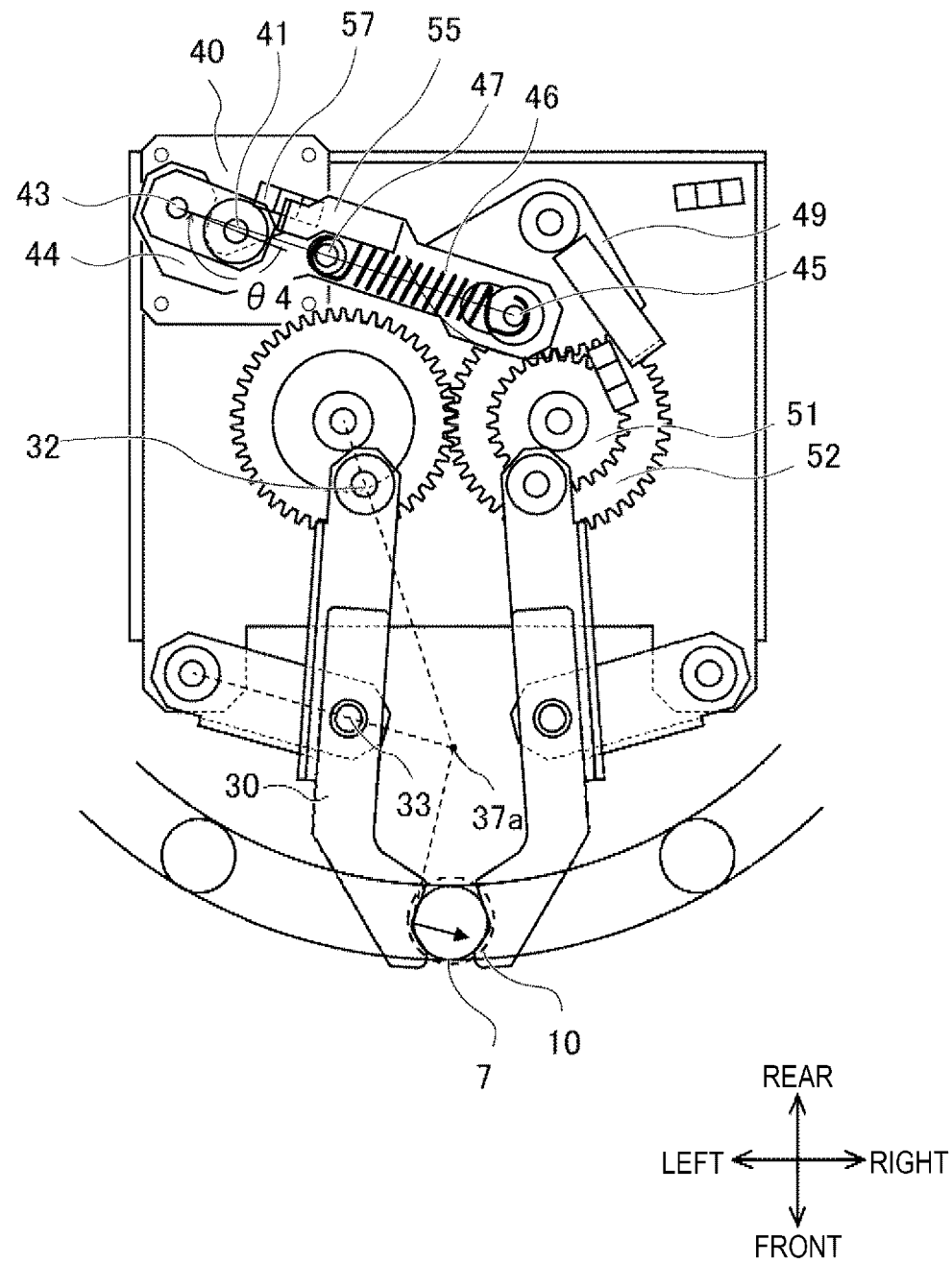

[FIG. 15]
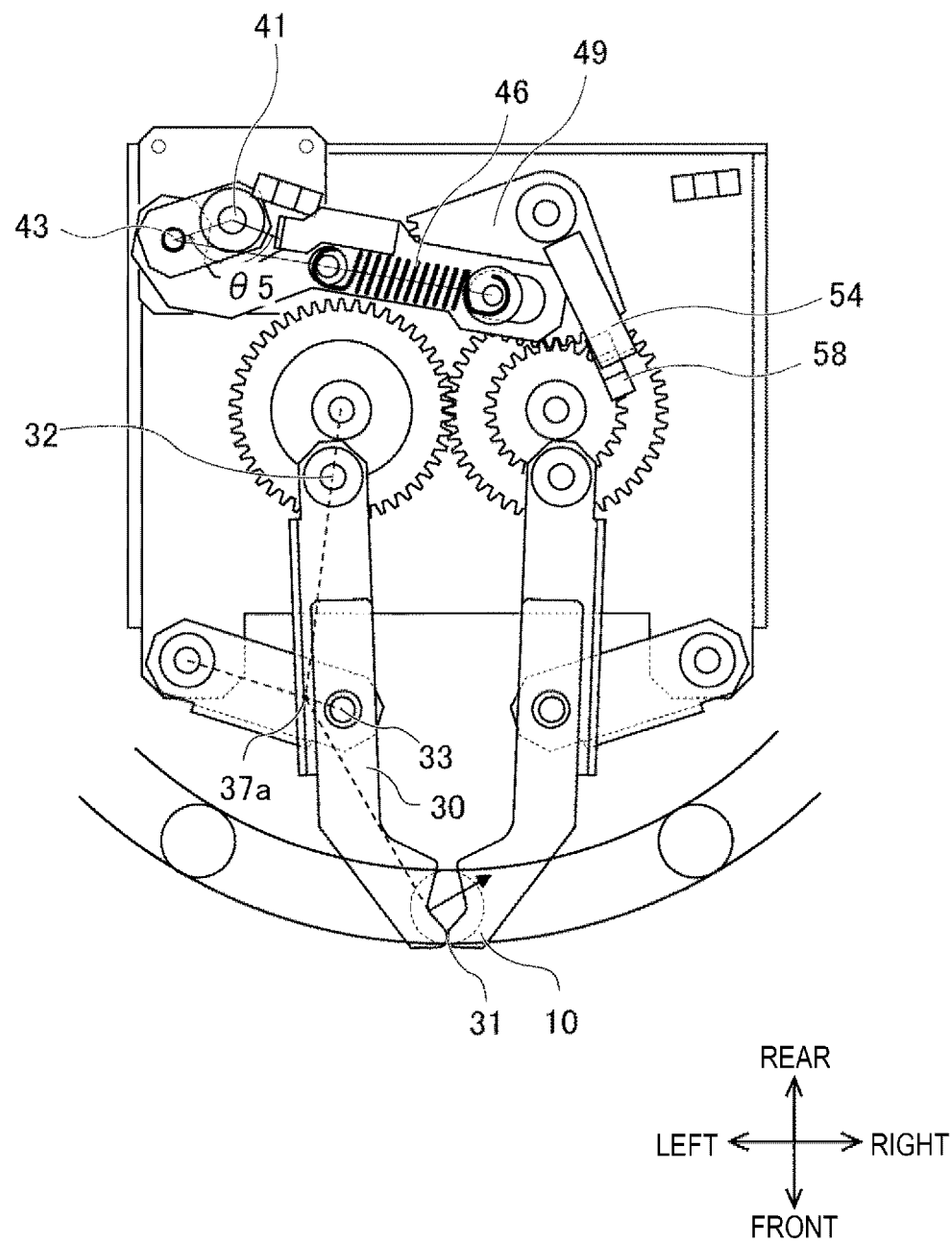

[FIG. 16]
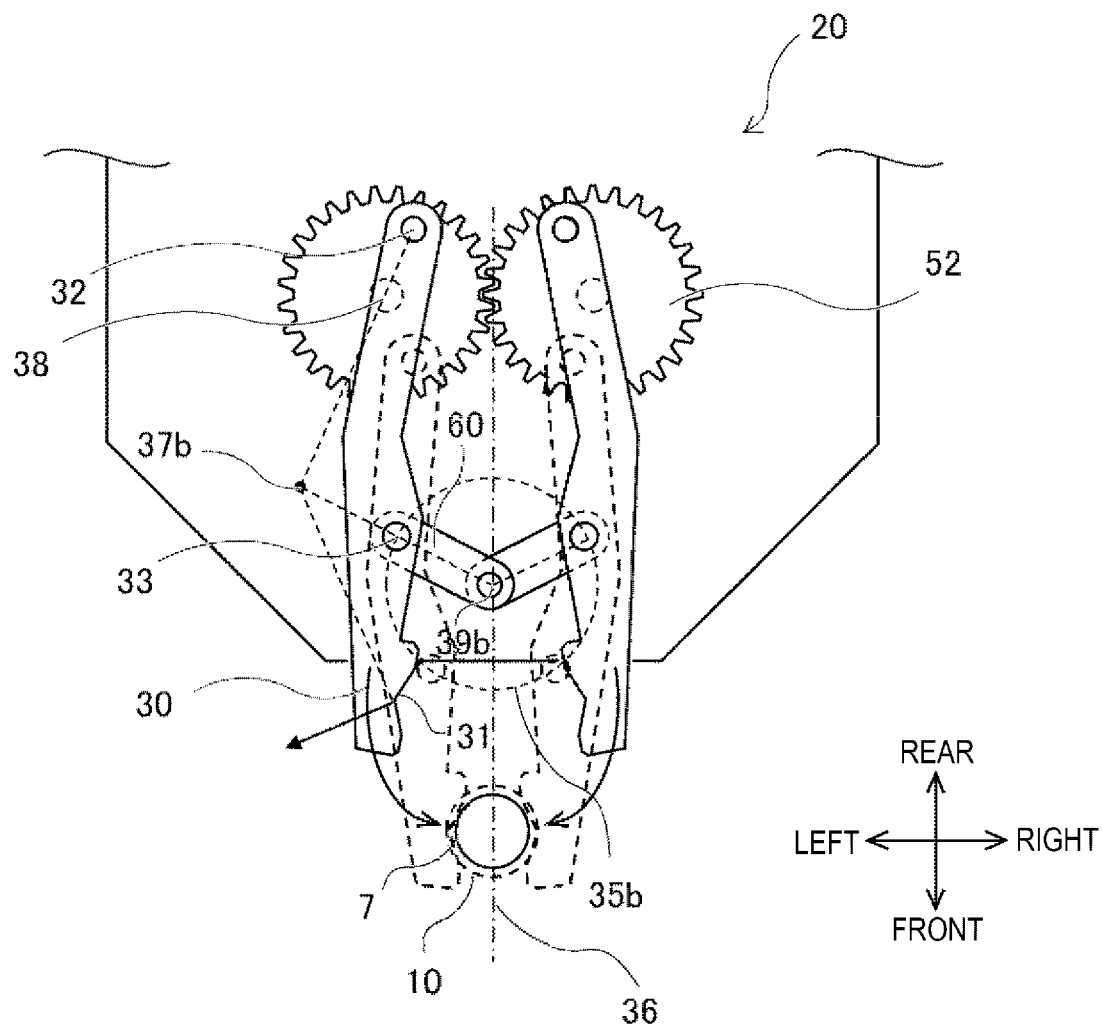

[FIG. 17]
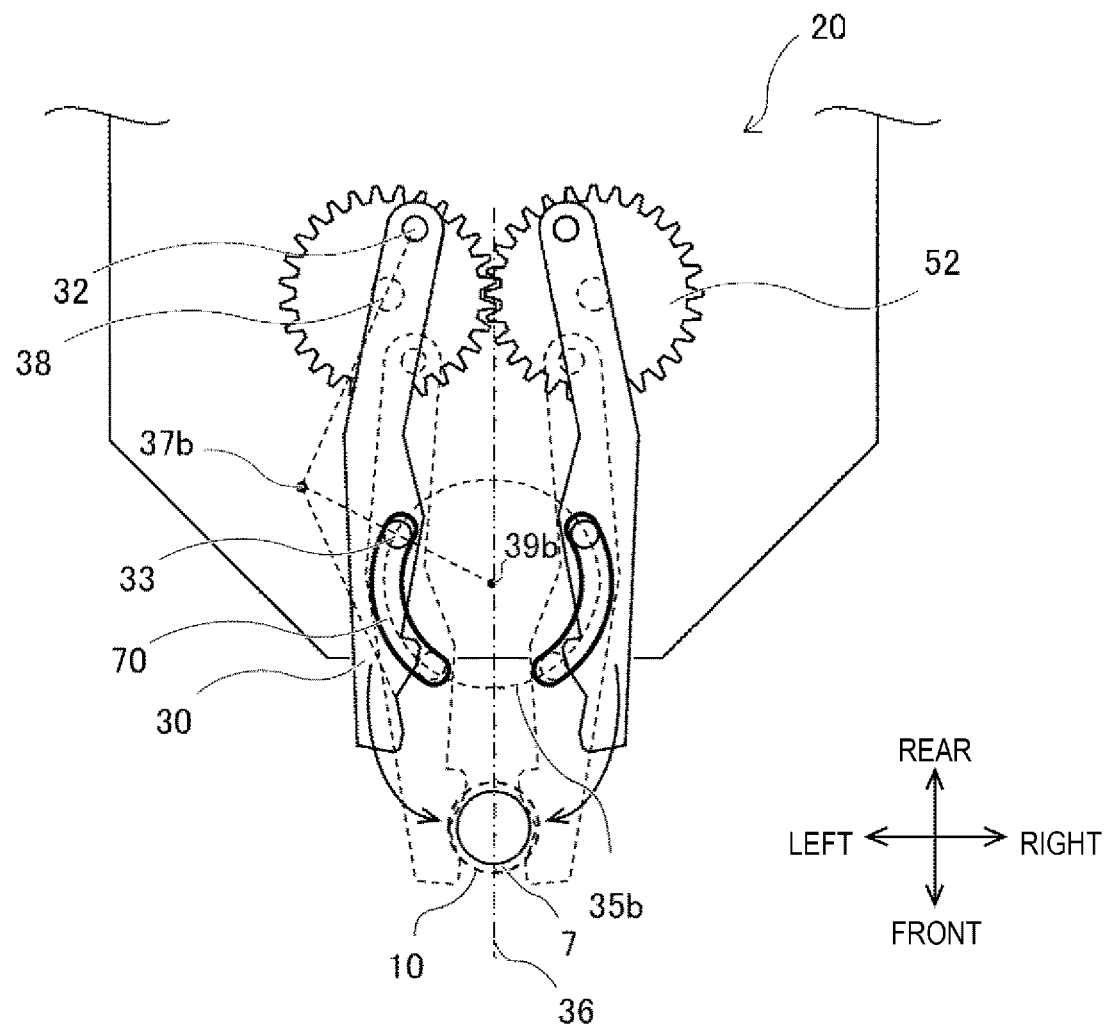

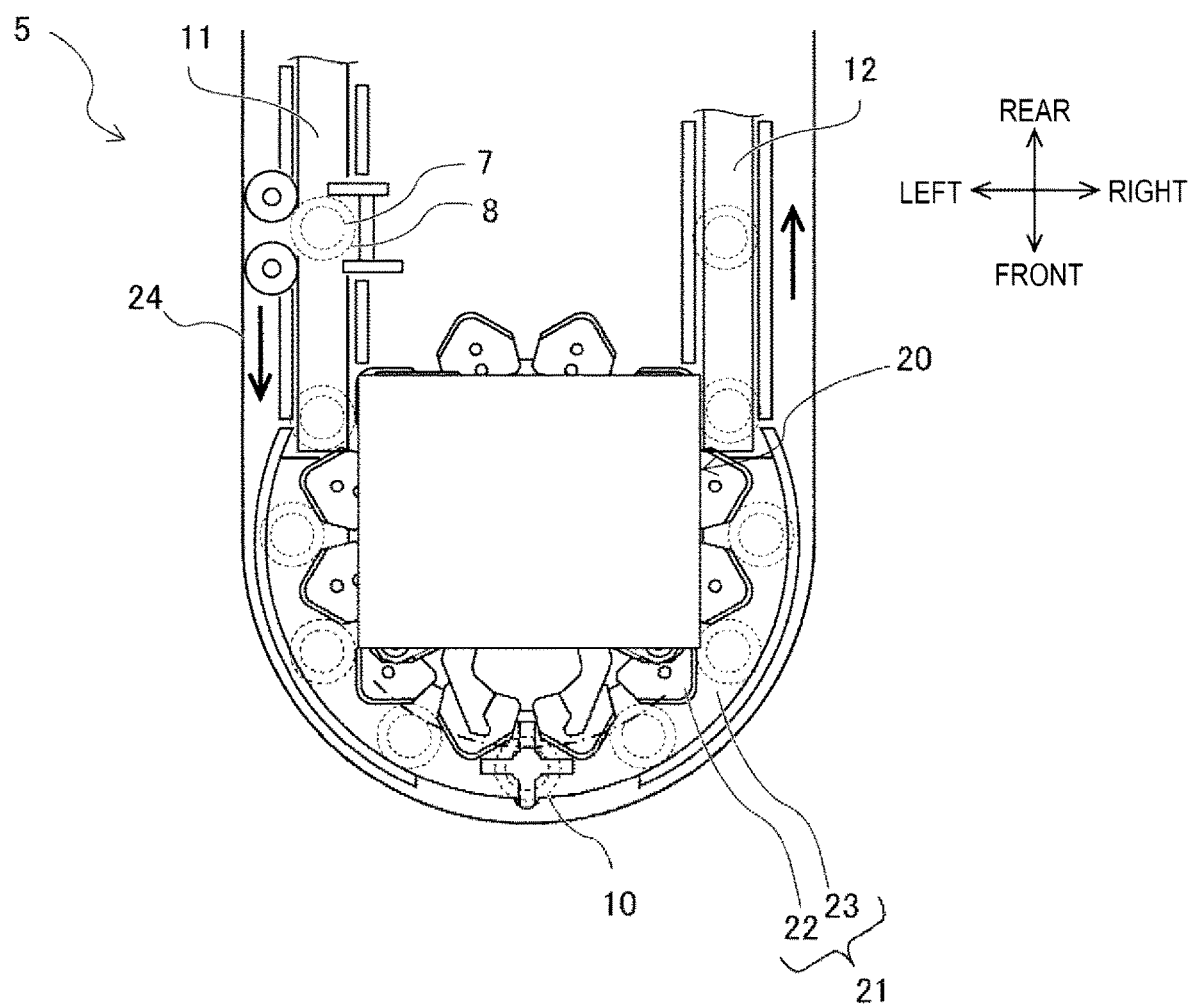
[FIG. 18]

[FIG. 19]
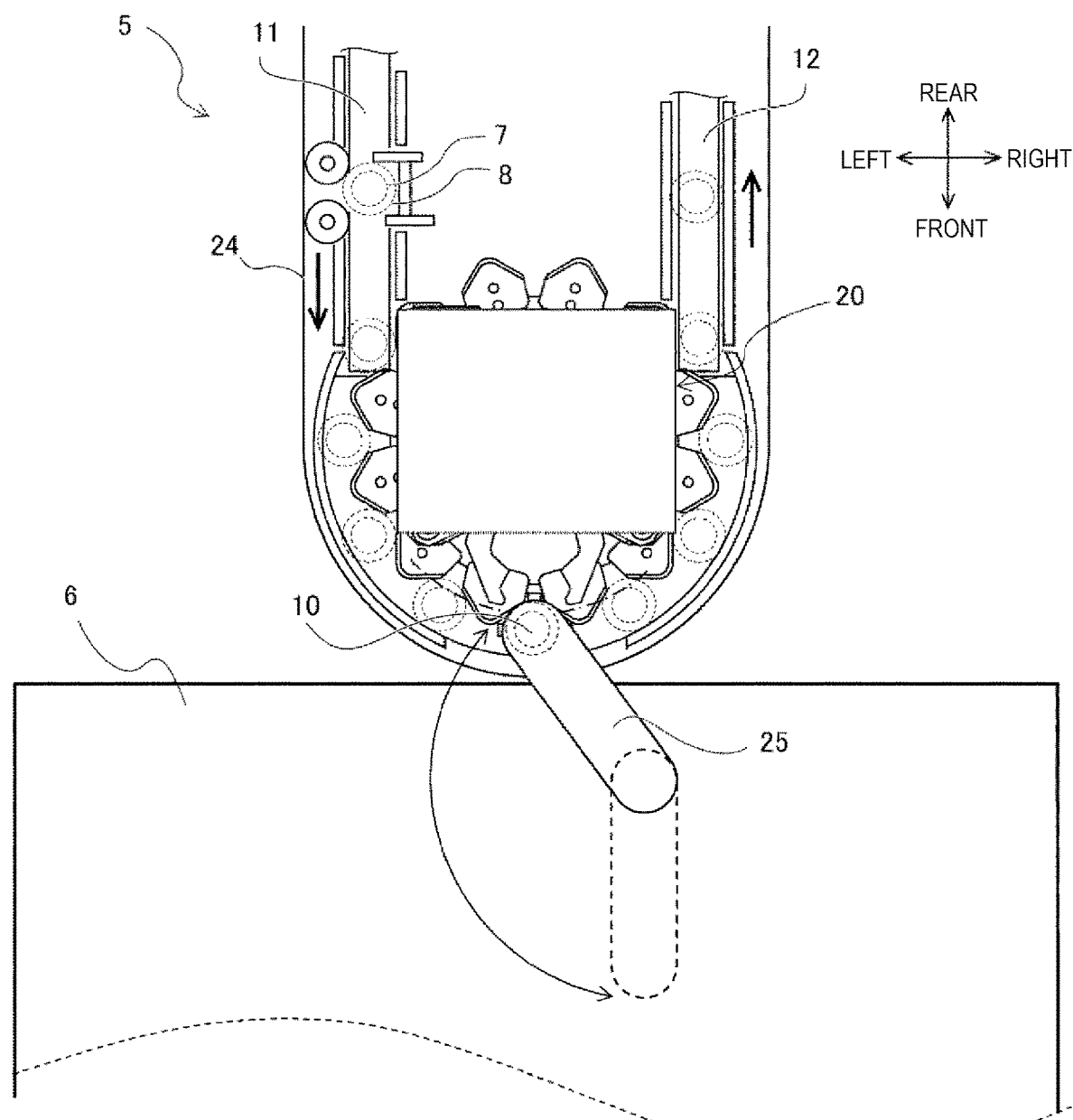

[FIG. 20]
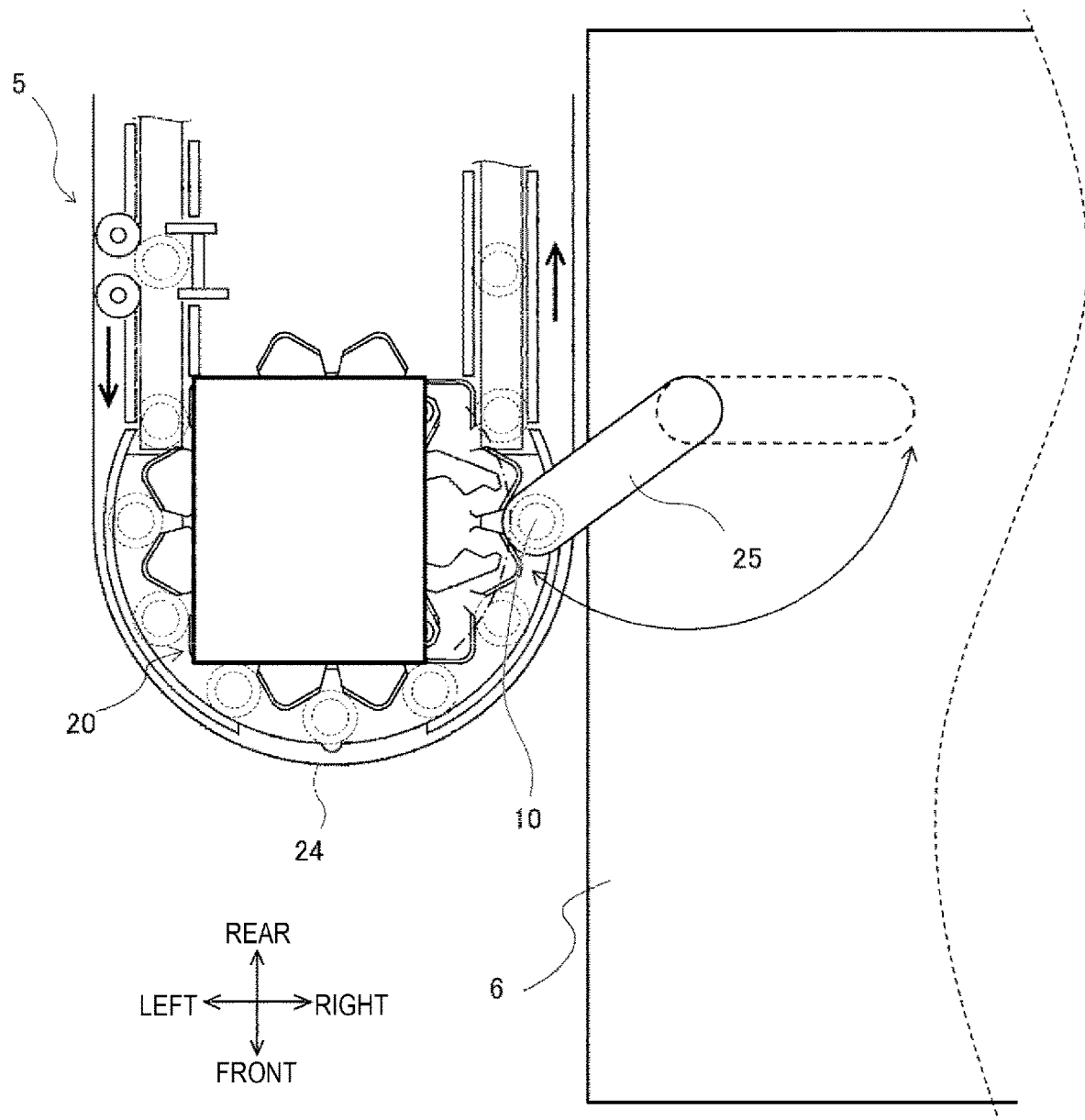

CONNECTION DEVICE AND AUTOMATED SYSTEM FOR INSPECTING SPECIMEN

TECHNICAL FIELD

The present invention relates to a connection device for connecting a specimen transport device that transports a specimen container in which a specimen such as blood or urine is accommodated and an analysis device that analyzes the specimen, and an automated system for inspecting a specimen, the automated system for inspecting a specimen including the connection device.

BACKGROUND ART

A hospital and an inspection facility use an automated system for inspecting a specimen to analyze a specimen such as blood or urine provided by a subject for a clinical test. The automated system for inspecting a specimen includes a preprocessing device that performs various types of preprocessing on a specimen container in which the specimen is accommodated, a specimen transport device that transports the specimen container, an analysis device that collects and analyzes the specimen from the specimen container, and a connection device that connects the specimen transport device and the analysis device. In the connection device, it is required to accurately dispose the specimen container at a position where the analysis device collects the specimen from the specimen container.

PTL 1 describes a device including a pair of centering jaws that accurately grip a specimen container held by a carrier in conjunction with transporting the carrier holding the specimen container to a predetermined position by a carousel and lifting the transported carrier.

CITATION LIST

Patent Literature

PTL 1: JP-A-2017-129576

SUMMARY OF INVENTION

Technical Problem

However, in PTL 1, since the specimen container is gripped in conjunction with lifting the carrier, an analysis device collects a specimen at a position higher than the carousel for transporting the carrier. Since the centering jaws that grip the specimen container are disposed outside the carousel, it is necessary to dispose the analysis device while avoiding the centering jaws. That is, many restrictions on disposing the analysis device are present.

Therefore, an object of the invention is to provide a connection device capable of improving a degree of freedom in disposing of an analysis device that analyzes a specimen, and an automated system for inspecting a specimen, the automated system including the connection device.

Solution to Problem

In order to achieve the above object, the invention relates to a connection device for connecting a specimen transport device that transports a specimen container in which a specimen is accommodated and an analysis device that analyzes the specimen. The connection device includes: a carousel that transports a specimen carrier, on which the specimen container is placed, at a predetermined interval; a grip unit that is disposed inside the carousel and grips the specimen container at a specimen collection position where the specimen is collected; and a housing that covers the carousel, in which the specimen collection position is above a transport path of the carousel and is located within a predetermined distance from the housing.

Further, the invention relates to an automated system for inspecting a specimen that preprocesses a specimen container and analyzes a specimen, the automated system for inspecting a specimen including the connection device.

Advantageous Effect

The invention can provide the connection device capable of improving a degree of freedom in disposing of the analysis device that analyzes the specimen, and the automated system for inspecting a specimen, the automated system for inspecting a specimen including the connection device.

BRIEF DESCRIPTION OF DRAWINGS

FIG. 1 is a diagram illustrating an overall configuration of an automated system for inspecting a specimen of a first embodiment.

FIG. 2 is a perspective view illustrating a connection device of the first embodiment.

FIG. 3 is a top view illustrating the connection device of the first embodiment.

FIG. 4 is a perspective view illustrating a specimen rack.

FIG. 5 is a top view illustrating an example of disposing the connection device and an analysis device of the first embodiment.

FIG. 6 is a side view illustrating a specimen collection unit of the analysis device.

FIG. 7 is a top view illustrating main portions of a grip unit.

FIG. 8 is a perspective view illustrating a configuration of an example of the grip unit.

FIG. 9 is a top view illustrating the configuration of the example of the grip unit.

FIG. 10 is a diagram illustrating an operation flow of the connection device of the first embodiment.

FIG. 11 is a top view illustrating an operation of the example of the grip unit.

FIG. 12 is a top view illustrating an operation of the example of the grip unit.

FIG. 13 is a top view illustrating an operation of the example of the grip unit.

FIG. 14 is a top view illustrating an operation of the example of the grip unit.

FIG. 15 is a top view illustrating an operation of the example of the grip unit.

FIG. 16 is a top view illustrating a configuration and an operation of another example of the grip unit.

FIG. 17 is a top view illustrating a configuration and an operation of another example of the grip unit.

FIG. 18 is a top view illustrating a connection device of a second embodiment.

FIG. 19 is a top view illustrating an example of disposing the connection device and an analysis device of the second embodiment.

FIG. 20 is a top view illustrating another example of disposing the connection device and the analysis device of the second embodiment.

DESCRIPTION OF EMBODIMENTS

First Embodiment

Hereinafter, the present embodiment will be described with reference to the drawings. In some drawings, directions of up, down, left, right, front, and rear are illustrated in order to clarify directions.

An automated system for inspecting a specimen 1 of the present embodiment will be described with reference to FIG. 1. The automated system for inspecting a specimen 1 is a system that performs various types of preprocessing on a specimen such as blood or urine provided by a subject and then analyzes the specimen for a clinical test. The automated system for inspecting a specimen 1 includes a preprocessing device 2, a specimen transport device 3, a specimen buffer 4, a connection device 5, an analysis device 6, and a control device 9. The devices are described below.

The preprocessing device 2 is a device that preprocesses the specimen before an analysis of the specimen. The preprocessing includes reception processing of a specimen container 7 in which the specimen is accommodated, centrifugal separation processing, measurement processing for an amount of liquid in the specimen container 7, cap removal processing of the specimen container 7, dispensation processing for subdividing the specimen, and the like.

The specimen transport device 3 is a device that transports a carrier 8, on which one specimen container 7 is placed, between the preprocessing device 2 and the analysis device 6. The specimen transport device 3 includes two transport paths which are a forward path and a backward path of the specimen carrier 8.

The specimen buffer 4 is a device that temporarily accommodates the specimen carrier 8 in order to prevent the specimen carrier 8 from being congested on the transport path. The specimen buffer 4 is provided as needed.

The connection device 5 is a device that is connected between the specimen transport device 3 and the analysis device 6, and transports the specimen carrier 8 to the specimen collection position 10 where the analysis device 6 collects the specimen. The connection device 5 will be described later with reference to FIGS. 2 and 3.

The analysis device 6 is a device that analyzes the specimen collected from the specimen container 7 on the specimen carrier 8 transported to the specimen collection position 10. The specimen is collected by a specimen collection unit 25 provided in the analysis device 6. The specimen collection unit 25 will be described later with reference to FIG. 6.

The control device 9 is, for example, a central processing unit (CPU), and controls operations of the devices based on information acquired by a sensor or the like.

The connection device 5 of the present embodiment will be described with reference to FIGS. 2 and 3. The connection device 5 includes a carousel 21, a housing 24, and a grip unit 20. The housing 24 is illustrated only in FIG. 3.

The carousel 21 is a device that transports the specimen carrier 8 to the specimen collection position 10, and includes a plurality of claws 22 and an arc-shaped transport path 23. The claws 22 are thin plates each having a substantially pentagonal plane shape, are arranged at equal intervals along the transport path 23 such that vertices face an outer circumference, and rotate along the transport path 23. Since a gap for holding the specimen carrier 8 is provided between the claws 22, a plurality of specimen carriers 8 are transported on the transport path 23 at equal intervals by the rotation of the claws 22.

The transport path 23 is connected to a specimen carry-in path 11 in which the specimen carriers 8 are carried in from the specimen transport device 3 and a specimen carry-out path 12 in which the specimen carriers 8 are carried out to the specimen transport device 3. The specimen carriers 8 carried into the specimen carry-in path 11 are dammed by a carrier separation unit 13. While the specimen carriers 8 are dammed, barcode labels or RFIDs attached to the specimen containers 7 are read by a reading unit 14, and information related to the specimens is acquired. After the information related to the specimens is acquired, the specimen carriers 8 are released from the carrier separation unit 13 and transported one by one to the transport path 23. The specimen carriers 8 transported to the transport path 23 are transported to the specimen collection position 10 by the rotation of the claws 22, and after the specimens are collected at the specimen collection position 10, the specimen carriers 8 are further transported and carried out from the specimen carry-out path 12. A predetermined number or more of the specimen containers 7 are preferably retained between the specimen carry-in path 11 and the specimen collection position 10, and FIG. 3 illustrates that five specimen containers 7a to 7e are retained.

The number of the specimen containers 7 retained between the specimen carry-in path 11 and the specimen collection position 10 is preferably equal to or greater than the number of the specimen containers 7 arranged in the specimen rack 15 illustrated in FIG. 4. The specimen rack 15 has a plurality of holes 16 into which the specimen containers 7 are inserted, and the specimen containers 7 can be arranged as many as the holes 16. FIG. 4 illustrates a state where four specimen containers 7 are inserted into the specimen rack 15 having five arrays. In the automated system for inspecting a specimen 1, the specimen containers 7 arranged in the specimen rack 15 are transported to the specimen carriers 8 one by one, various types of processing are performed, and then the specimen containers 7 are returned to the same specimen rack 15. Therefore, the number of the specimen containers 7 retained between the specimen carry-in path 11 and the specimen collection position 10 is equal to or greater than the number of arrays of the specimen rack 15, so that the specimen containers 7 can easily return to the same specimen rack 15 without making a mistake.

The housing 24 is a box that covers the carousel 21. The housing 24 is provided with an opening into which the specimen collection unit 25, which will be described later, enters. FIG. 3 illustrates the rectangular housing 24 that is easy to manufacture.

The grip unit 20 is disposed inside the carousel 21 and grips the specimen container 7 transported to the specimen collection position 10. The grip unit 20 grips the specimen container 7, so that a position of the specimen container 7 can be fixed and the specimen container 7 can be prevented from tipping over. The grip unit 20 waits outside the transport path 23 until the specimen carrier 8 is transported to the specimen collection position 10, and when the specimen carrier 8 is transported to the specimen collection position 10, the grip unit 20 moves horizontally toward the transport path 23 and grips the specimen container 7 from a horizontal direction at the specimen collection position 10. The grip unit 20 waits outside the transport path 23 until the specimen carrier 8 is transported to the specimen collection position 10, and when the specimen carrier 8 is transported to the specimen collection position 10, the grip unit 20 moves horizontally toward the specimen container 7, and thus a foreign matter is not mixed into the specimen container 7. The grip unit 20 does not interfere with the transport of the specimen container 7 since the grip unit 20 waits outside the transport path 23 until the specimen carrier 8 is transported to the specimen collection position 10, and the grip unit 20 can be miniaturized in an up-down direction since the grip unit 20 does not move in a vertical direction but only moves in a horizontal direction.

A disposing example of the connection device 5 and the analysis device 6 will be described with reference to FIG. 5. The specimen collection unit 25 provided in the analysis device 6 collects the specimen from the specimen container 7 transported by the carousel 21 of the connection device 5.

The specimen collection unit 25 will be described with reference to FIG. 6. The specimen collection unit 25 includes an arm 26, a nozzle 27, and a support column 28. The arm 26 connects the nozzle 27 and the support column 28, and rotates around the support column 28 as a rotation axis. The support column 28 moves up and down while rotating to move the nozzle 27 connected via the arm 26 to a predetermined position. The nozzle 27 is inserted into the specimen container 7 gripped by the grip unit 20, and the specimen accommodated in the specimen container 7 is collected. The specimen collected by the nozzle 27 is analyzed by the analysis device 6 for a clinical test.

In order to improve the degree of freedom in the disposing of the analysis device 6, the specimen collection position 10 may be set to a position where the specimen collection unit 25 can be easily accessed without shifting the transport path 23 of the carousel 21. Therefore, in the present embodiment, the specimen collection position 10 is disposed above the transport path 23 of the carousel 21 and within a predetermined distance from the housing 24. A distance from the housing 24 to the specimen collection position 10 is, for example, a distance that the specimen collection unit 25 can reach. It is preferable that the specimen collection position 10 is above the transport path 23 of the carousel 21 and is a farthest position from the specimen carry-in path 11 and the specimen carry-out path 12. With such disposing, sufficient spaces are provided in front of the specimen collection position 10 and on left and right sides of the connection device 5, and thus the degree of freedom can be improved without hindering the disposing of the analysis device 6.

Main portions of the grip unit 20 will be described with reference to FIG. 7. The grip unit 20 includes a pair of clamps 30 arranged symmetrically. FIG. 4 illustrates only a left one of the pair of clamps 30, and the right clamp 30 symmetrically arranged with respect to an axis of symmetry 36 is omitted. The axis of symmetry 36 is preferably a line connecting a center of the carousel 21 and the specimen collection position 10. The clamps 30 each have a contact surface 31, a first pin 32, and a second pin 33.

The contact surface 31 is a surface that comes into contact with the specimen container 7 and is provided at one end of the clamp 30. The contact surfaces 31 come into contact with the specimen container 7 from the left and right to grip the specimen container 7. Since the specimen container 7 is gripped by the contact surfaces 31 provided symmetrically, the specimen container 7 is gripped stably and accurately.

The first pin 32 is a shaft driven to draw an arc in a horizontal plane, and is provided at the other end of the clamp 30. The arc drawn by the first pin 32 is a first arc 34, and a center of the first arc 34 is a first center 38. The directions where the first pins 32 are driven are opposite in left and right, and when the first pin 32 on the left side is clockwise, the first pin 32 on the right side is counterclockwise.

The second pin 33 is a shaft that is moved in a horizontal plane so as to draw an arc with the drive of the first pin 32, and is provided between both ends of the clamp 30. The arc drawn by the second pin 33 is a second arc 35, and a center of the second arc 35 is a second center 39. The directions where the second pins 33 are moved are opposite in left and right, as in the case of the first pins 32.

The second center 39 may be outside the pair of clamps 30 or on the axis of symmetry 36. In order to distinguish between these two kinds of second centers, the second center 39 outside the pair of clamps 30 is referred to as a second center 39*a*, and the second center 39 on the axis of symmetry 36 is referred to as a second center 39*b*. The second arc 35 with respect to the second center 39*a* is referred to as a second arc 35*a*, and the second arc 35 with respect to the second center 39*b* is referred to as a second arc 35*b*. The second center 39*b* and the second arc 35*b* are shared by the left and right clamps.

In the grip unit 20 including the above main portions, a direction where the first pin 32 is driven is a tangential direction of the first arc 34, and a direction where the second pin 33 moves is a tangential direction of the second arc 35. Therefore, directions where points on the clamp 30 move are tangential directions of the arc centered on an intersection 37 of a straight line connecting the first pin 32 and the first center 38 and a straight line connecting the second pin 33 and the second center 39. In FIG. 4, as an example of a direction where the contact surface 31 of the clamp 30 moves, a tangential direction of an arc centered on an intersection 37*a* of the straight line connecting the first pin 32 and the first center 38 and a straight line connecting the second pin 33 and the second center 39*a* is indicated by an arrow. When the second center 39 is on the axis of symmetry 36, a tangential direction of an arc centered at an intersection 37*b* of the straight line connecting the first pin 32 and the first center 38 and a straight line connecting the second pin 33 and the second center 39*b* is a moving direction of the point on the clamp 30.

A more specific configuration of the grip unit 20 will be described with reference to FIGS. 8 and 9. The grip unit 20 of the present embodiment includes a transmission unit that transmits a rotational driving force generated by a motor 40 to the first pin 32, and the transmission unit includes a crank arm 42, a connecting plate 44, a first gear 49, a second gear 51, third gears 52, and the like. An example of the transmission unit will be described.

The motor 40 is, for example, a stepping motor, and includes a rotation shaft 41 that rotates about an up-down direction. When the motor 40 rotates in a forward direction, the rotation shaft 41 rotates clockwise. Since one end of the crank arm 42 is fixedly connected to the rotation shaft 41, the crank arm 42 rotates integrally with the rotation shaft 41. A connecting shaft 43 rotatably connected to one end of the connecting plate 44 is provided at the other end of the crank arm 42, and a long hole 48 facing a connecting shaft 43 direction is formed through the other end of the connecting plate 44. A transmission shaft 45 connected to the first gear 49, which is a fan-shaped gear having a central angle of about 90 degrees, is passed through the long hole 48. Since the transmission shaft 45 can move along the long hole 48, when the rotation shaft 41 rotates clockwise, the transmission shaft 45 is pulled to a left direction, and the first gear 49 rotates clockwise with the first gear shaft 50 as a rotation center.

The transmission shaft 45 is connected to one end of a spring 46, which is a pulling spring, and the other end of the spring 46 is supported at a spring fixing portion 47 by the connecting plate 44. The transmission shaft 45, which is pulled toward the spring fixing portion 47 by the spring 46, maintains a state of being in contact with a surface of the long hole 48 on a connecting shaft 43 side.

Since the second gear 51 meshes with the first gear 49, when the first gear 49 rotates clockwise, the second gear 51 rotates counterclockwise. The second gear 51 shares the first center 38, which is a rotation axis, with a right one of a pair of left and right third gears 52, and thus when the second gear 51 rotates counterclockwise, the third gear 52 on the right side also rotates counterclockwise. Since the pair of left and right third gears 52 have the same number of teeth and mesh with each other, when the third gear 52 on the right side rotates counterclockwise, the third gear 52 on the left side rotates clockwise. The pair of left and right third gears 52 are provided with the first pins 32 having the clamps 30 arranged symmetrically, and thus the rotation of the third gears 52 causes the first pins 32 to be driven symmetrically on the first arcs 34, respectively.

The second pins 33 of the clamps 30 arranged symmetrically are rotatably connected to one end of a left link arm 53 and one end of a right link arm 53, respectively, and the second centers 39a rotatably supported are provided symmetrically at the other two ends of the link arms 53. That is, the link arms 53 move the second pins 33 on the second arcs 35a.

As the first pin 32 drives on the first arc 34, the second pin 33 moves on the second arc 35a, and thus the contact surface 31 moves in the tangential direction of the arc centered on the intersection 37a. The intersection 37a is a point where the straight line connecting the first pin 32 and the first center 38 and the straight line connecting the second pin 33 and the second center 39a intersect, and a position changes with the movement of the first pin 32 and the second pin 33, and thus the contact surface 31 moves while drawing a curve as illustrated by the arrow in FIG. 6.

A first detection plate 54 and a first sensor 56 may be provided in order to detect a rotation angle of the first gear 49. The first detection plate 54 is fixed to the first gear 49 and rotates together with the first gear 49. The first sensor 56 is disposed at a position for detecting the first detection plate 54 when the rotation shaft 41, the connecting shaft 43, the spring fixing portion 47, and the transmission shaft 45, which are at origin positions of the grip unit 20, are arranged substantially in a straight line in the described order.

A second detection plate 55 and a second sensor 57 may be provided to detect a position of the connecting plate 44. The second detection plate 55 is fixed to the connecting plate 44 and moves together with the connecting plate 44. The second sensor 57 is disposed at a position for detecting the second detection plate 55 when the connecting shaft 43, the rotation shaft 41, the spring fixing portion 47, and the transmission shaft 45 are arranged substantially in a straight line in the described order.

A third sensor 58 may be disposed at a position for detecting the first detection plate 54 when the first gear 49 reaches a predetermined rotation angle. The first sensor 56, the second sensor 57, and the third sensor 58 are fixed to the grip unit 20 by support members (not illustrated).

An example of an operation flow of the grip unit 20 of the present embodiment will be described with reference to FIG. 10.

(S1001)

The connection device 5 carries in the specimen carrier 8 based on an instruction from the control device 9. It is preferable that the reading unit 14 obtains information about the specimens while the specimen carriers 8 are dammed by the carrier separation unit 13. It is preferable that the control device 9 moves the grip unit 20 to an origin position based on an output of the first sensor 56.

(S1002)

The claws 22 of the carousel 21 rotate in a circumferential direction of the transport path 23 based on an instruction from the control device 9. The specimen carrier 8 retained between the claws 22 is transported along the transport path 23.

(S1003)

The control device 9 determines whether the specimen carrier 8 reaches the specimen collection position 10. If the specimen carrier 8 does not reach the specimen collection position 10, the processing returns to S1002, and if the specimen carrier 8 reaches the specimen collection position 10, the processing proceeds to S1004.

(S1004)

The control device 9 causes the motor 40 to rotate in the forward direction in a state where the carousel 21 is stopped. Depending on a height of the analysis device 6, a height of the specimen carrier 8 may be adjusted by an elevating device (not illustrated).

(S1005)

The control device 9 determines whether the grip unit 20 grips the specimen container 7. If the specimen container 7 is not gripped, the processing proceeds to S1006, and if the specimen container 7 is gripped, the processing proceeds to S1007.

The operation until the grip unit 20 grips the specimen container 7 will be described with reference to FIGS. 11 to 14. FIG. 11 illustrates a state where the connecting shaft 43 rotates by an angle θ1 from the origin position by rotating the rotation shaft 41 clockwise. As the connecting shaft 43 rotates, the first pin 32 and the second pin 33 move, and the intersection 37a also moves, so that a moving direction of the contact surface 31 is an arrow direction in FIG. 11. Since the first detection plate 54 is detached from the first sensor 56 in FIG. 11, the rotation shaft 41 may rotate counterclockwise in the state of FIG. 11 to move the grip unit 20 to the origin position in the S1001.

FIG. 12 illustrates a state where the connecting shaft 43 rotates by an angle θ2 (>θ1) from the origin position by further rotating the rotation shaft 41 clockwise. As the first pin 32 and the second pin 33 move, the intersection 37a of the straight line connecting the first pin 32 and the first center 38 and the straight line connecting the second pin 33 and the second center 39 moves to a position illustrated in FIG. 12, and thus the moving direction of the contact surface 31 is an arrow direction in FIG. 12. The clamps 30 intersect the transport path 23.

FIG. 13 illustrates a state where the connecting shaft 43 rotates by an angle θ3 (>θ2) from the origin position by further rotating the rotation shaft 41 clockwise. The intersection 37a moves with the movement of the first pin 32 and the second pin 33, and the contact surfaces 31 come into contact with the specimen container 7 disposed at the specimen collection position 10. In a process from the origin position to the state illustrated in FIG. 13, the spring 46 only pulls the transmission shaft 45 in the long hole 48, and an elastic force of the spring 46 is not transmitted from the transmission shaft 45 to the first gear 49. Therefore, a load required for the movement of the clamps 30 is only an inertial force and a friction load due to acceleration, and thus power consumption of the motor 40 from the origin position to the contact of the contact surfaces 31 with the specimen container 7 can be reduced. Since the clamps 30 are driven by one motor 40, the grip unit 20 can be configured at a low cost. In the state of FIG. 13, the contact surfaces 31 are merely in contact with the specimen container 7, and the clamps 30 do not have a force to grip the specimen container 7.

FIG. 14 is a state where as the rotation shaft 41 further rotates clockwise, the connecting shaft 43 rotates by an angle θ4 (>θ3) from the origin position, and is moved to an opposite side of the transmission shaft 45. Since the clamps 30 are in contact with the specimen container 7, as the positions of the first pin 32 and the second pin 33 are fixed, rotation angles of the third gear 52, the second gear 51, and the first gear 49, and a position of the transmission shaft 45 are fixed. The position of the transmission shaft 45 is fixed, but the spring fixing portion 47 moves in a direction closer to the rotation shaft 41 together with the connecting plate 44, and thus the spring 46 is stretched to generate torque that causes the first gear 49 to rotate clockwise via the transmission shaft 45. The torque acts on the clamp 30 via the second gear 51 and the third gear 52, and is a force for gripping the specimen container 7. In the state of FIG. 14, since a straight line connecting the connecting shaft 43 and the spring fixing portion 47 is located behind a center of the rotation shaft 41, the elastic force of the spring 46 can prevent the motor 40 from rotating in a reverse direction.

The second sensor 57 may be disposed at a position for detecting the second detection plate 55 when the straight line connecting the connecting shaft 43 and the spring fixing portion 47 is located behind the center of the rotation shaft 41. That is, whether the grip unit 20 grips the specimen container 7 may be determined based on an output of the second sensor 57.

(S1006)

The control device 9 determines whether it is detected that the specimen container 7 does not exist on the specimen carrier 8 transported to the specimen collection position 10. If it is not detected that the specimen container 7 does not exist, the processing returns to S1004, and if it is detected that the specimen container 7 does not exist, the processing proceeds to S1009.

A case where the specimen container 7 does not exist will be described with reference to FIG. 15. FIG. 15 is a state where from the state of FIG. 12 in which the contact surfaces 31 are in contact with the specimen container 7, the rotation shaft 41 further rotates clockwise, so that the connecting shaft 43 rotates by an angle θ5 (>θ3) from the origin position. θ5 is smaller than θ4. The intersection 37a moves with the movement of the first pin 32 and the second pin 33, and the contact surfaces 31 come into contact with each other. Since the contact surfaces 31 do not come into contact with the specimen container 7, the first gear 49 further rotates from the state in FIG. 12, and as the first gear 49 rotates, the first detection plate 54 moves to a position of the third sensor 58, and an output of the third sensor 58 changes. That is, a state where the specimen container 7 does not exist at the specimen collection position 10 may be detected based on the output of the third sensor 58.

(S1007)

The control device 9 stops the motor 40. The specimen container 7 is gripped by the torque acting on the clamps 30 when the spring 46 is stretched.

(S1008)

The specimen collection unit 25 of the analysis device 6 collects the specimen from the specimen container 7 gripped by the grip unit 20.

(S1009)

The control device 9 causes the motor 40 to rotate in the reverse direction. When the motor 40 rotates in the reverse direction, the pair of clamps 30 releases the grip of the specimen container 7 and moves the specimen container 7 horizontally toward the origin position.

(S1010)

The control device 9 determines whether the specimen carrier 8 reaches the origin position. If the specimen carrier 8 does not reach the origin position, the processing returns to S1009, and if the specimen carrier 8 reaches the origin position, the processing proceeds to S1011. Whether the specimen carrier 8 reaches the origin position may be determined by the output of the first sensor 56.

(S1011)

The control device 9 stops the motor 40. The pair of clamps 30 return to the origin position. When the height of the specimen carrier 8 is adjusted in S1004, the specimen carrier 8 is returned to an original height in the present step.

(S1012)

The control device 9 determines existence of a next specimen to be analyzed. If no next specimen exists, the processing ends, and if the next specimen exists, the processing returns to S1001.

According to the processing flow described above, the specimen container 7 can be gripped without mixing a foreign matter, such as abrasion powder generated from the pair of clamps 30, into the specimen accommodated in the specimen container 7 on the transport path 23. Since the grip unit 20 of the present embodiment moves in the horizontal direction and grips the specimen container 7 from the horizontal direction, the grip unit 20 can be miniaturized in the up-down direction. The pair of clamps 30 waits outside the transport path 23 until the specimen carrier 8 is transported to the specimen collection position 10, so that the transport of the specimen container 7 is not hindered.

The grip unit 20 is not limited to the configuration illustrated in FIGS. 8 and 9. A modification of the grip unit 20 will be described with reference to FIG. 16. In a case of the second center 39b as the second center 39 on the axis of symmetry 36 of the pair of clamps 30, the grip unit 20 in FIG. 16 includes the pair of clamps 30 and the pair of third gears 52 arranged symmetrically as in the case of FIGS. 8 and 9. In FIG. 16, the configurations of the motor 40 to the second gear 51 are omitted.

The clamps 30, similar to the case of FIGS. 8 and 9, each include the contact surface 31, the first pin 32, and the second pin 33. The contact surface 31 is the surface that comes into contact with the specimen container 7 and is provided at one end of the clamp 30. The first pin 32 is provided at the other end of the clamp 30 and is rotatably connected to the third gear 52 so as to be driven to draw an arc centered on the first center 38. The second pin 33 is provided between both ends of the clamp 30 and is rotatably connected to one end of a second link arm 60. The other end of the second link arm 60 is rotatably connected to the second center 39b located on the axis of symmetry 36. The second link arms 60 are arranged symmetrically with respect to the axis of symmetry 36.

According to such a configuration, the second pin 33 in FIG. 16 is moved so as to draw the second arc 35b centered on the second center 39b as the first pin 32 is driven. The contact surface 31 moves in the tangential direction of the arc centered on the intersection 37b of the straight line connecting the first pin 32 and the first center 38 and the straight line connecting the second pin 33 and the second center 39b. FIG. 16 illustrates a state where the grip unit 20 is at the origin position, and indicates, by an arrow, a direction where the contact surface 31 moves when the third gear 52 on the left side rotates clockwise.

Another modification of the grip unit 20 will be described with reference to FIG. 17. The grip unit 20 of FIG. 17 uses, instead of the second link arms 60 of FIG. 16, guide grooves 70 in which the second pins 33 slide and move. Similar to FIG. 16, the grip unit 20 of FIG. 17 includes the pair of symmetrical clamps 30 and the pair of symmetrical third gears 52, the clamps 30 each include the contact surface 31, the first pin 32, and the second pin 33, the contact surface 31 is the surface that comes into contact with the specimen container 7, and the first pin 32 is rotatably connected to the third gear 52. The second pin 33 in FIG. 17 moves while sliding in the guide groove 70 provided along the second arc 35b centered on the second center 39b. The guide grooves 70 are arranged symmetrically with respect to the axis of symmetry 36. The guide grooves 70 are not limited to a shape along the second arc 35b, and may have a shape along the second arc 35a illustrated in FIG. 7.

According to such a configuration, the second pin 33 in FIG. 17 is moved so as to draw the second arc 35b as the first pin 32 is driven. The contact surface 31 moves in the tangential direction of the arc centered on the intersection 37b of the straight line connecting the first pin 32 and the first center 38 and the straight line connecting the second pin 33 and the second center 39b. In FIG. 17, solid lines indicate a state where the grip unit 20 is in the origin position, dotted lines indicate a state where the clamps 30 grip the specimen container 7 at the specimen collection position 10, and curved arrows indicate the moving directions of the contact surfaces 31 from the origin position to a gripping state.

According to the configuration described above, the connection device 5 of the present embodiment can improve the degree of freedom in the disposing of the analysis device 6.

Second Embodiment

In the first embodiment, the case where the housing 24 of the connection device 5 is rectangular is described. In the present embodiment, a case where the housing 24 has an arc shape will be described. The description of the same configuration as that in the first embodiment will be omitted.

A configuration of the connection device 5 of the present embodiment will be described with reference to FIG. 18. The connection device 5 of the present embodiment, similar to the first embodiment, includes the carousel 21, the housing 24, and the grip unit 20. The carousel 21 of the present embodiment, similar to the first embodiment, includes the arc-shaped transport path 23.

The grip unit 20, similar to the first embodiment, is disposed inside the carousel 21, and grips the specimen container 7 in the specimen collection position 10. More specifically, the grip unit 20 may be any configuration as long as the grip unit 20 moves horizontally toward the transport path 23 and grips the specimen container 7 transported to the specimen collection position 10 from the horizontal direction, and is, for example, the configuration illustrated in FIGS. 8 and 9, or FIG. 16 or 17. Since the grip unit 20 may be any configuration as long as the grip unit 20 is horizontally moved to the transport path 23 and grips the specimen container 7 from the horizontal direction at the specimen collection position 10, the grip unit 20 is indicated by a white rectangle in FIG. 18.

The housing 24 has a shape along the arc-shaped transport path 23, the specimen carry-in path 11, and the specimen carry-out path 12. In the present embodiment, the specimen collection position 10 is disposed at any position on the arc-shaped transport path 23 and within a predetermined distance from the housing 24. Since the housing 24 has the shape along the arc-shaped transport path 23, even if the specimen collection position 10 is located at an optional position of the arc-shaped transport path 23 within the predetermined distance from the housing 24, a sufficient space is provided around the connection device 5. FIG. 18 illustrates the specimen collection position 10 located farthest from the specimen carry-in path 11 and the specimen carry-out path 12.

A disposition example of the connection device 5 and the analysis device 6 will be described with reference to FIG. 19. FIG. 19 illustrates the analysis device 6 including the specimen collection unit 25 that accesses the specimen collection position 10 located farthest from the specimen carry-in path 11 and the specimen carry-out path 12. In such disposition, sufficient spaces are provided in front of the specimen collection position 10 and on left and right sides of the connection device 5, and thus the disposing of the analysis device 6 is not hindered and the degree of freedom in the disposing of the analysis device 6 with respect to the analysis device 5 can be improved. Since a sufficient space is provided behind the grip unit 20 in a front-rear direction, which is a moving direction of the grip unit 20, the grip unit 20 can be increased in size. The increase in size of the grip unit 20 enables accurate gripping of the specimen container 7 and enhancement of a gripping force.

Another disposition example of the connection device 5 and the analysis device 6 will be described with reference to FIG. 20. FIG. 20 illustrates the analysis device 6 including the specimen collection unit 25 that accesses the specimen collection position 10 located on the transport path 23 and disposed at a right end of the connection device 5. In such disposition, sufficient spaces are provided on a right side of the specimen collection position 10 and provided in front and rear of the connection device 5, and thus the disposing of the analysis device 6 is not hindered and the degree of freedom in the disposing of the analysis device 6 with respect to the analysis device 5 can be improved. The number of the specimen containers 7 retained between the specimen carry-in path 11 and the specimen collection position 10 increases. According to the increase in the number of the retained specimen containers 7 between the specimen carry-in path 11 and the specimen collection position 10, an increase in size of the specimen rack 15 to be put into the automated system for inspecting a specimen 1 is enabled, and efficiency of the specimen test can be improved.

In the above, two embodiments of the connection device and the automated system for inspecting a specimen of the invention are described. The invention is not limited to the above embodiments, and can be embodied by modifying constituent elements without departing from a spirit of the invention. In addition, a plurality of constituent elements disclosed in the above embodiments may be appropriately combined. Furthermore, some constituent elements may be deleted from all the constituent elements shown in the above embodiments.

REFERENCE SIGN LIST

1: automated system for inspecting specimen
2: preprocessing device
3: specimen transport device
4: specimen buffer
5: connection device
6: analysis device
7: specimen container
8: specimen carrier 9: control device
10: specimen collection position
11: specimen carry-in path
12: specimen carry-out path
13: carrier separation unit
14: reading unit
15: specimen rack
16: hole
20: grip unit
21: carousel
22: claw
23: transport path
24: housing
25: specimen collection unit
26: arm
27: nozzle
28: support column
30: clamp
31: contact surface
32: first pin
33: second pin
34: first arc
35: second arc
36: axis of symmetry
37: intersection
38: first center
39: second center
40: motor
41: rotation shaft
42: crank arm
43: connecting shaft
44: connecting plate
45: transmission shaft
46: spring
47: spring fixing portion
48: long hole
49: first gear
50: first gear shaft
51: second gear
52: third gear
53: link arm
54: first detection plate
55: second detection plate
56: first sensor
57: second sensor
58: third sensor
60: second link arm
70: guide groove

The invention claimed is:

1. A connection device configured to connect a specimen transport device configured to transport specimen containers accommodating specimens and an analysis device configured to analyze the specimens, the connection device comprising:
a carousel configured to transport a plurality of specimen carriers, each on which the specimen container is placed, at a predetermined interval;
a grip unit disposed inside the carousel and configured to grip the specimen containers at a specimen collection position where the specimens are collected, the grip unit including a motor, a pair of clamps, each of which includes a first pin, a second pin and a contact surface configured to contact the specimen containers, and a rotational driving force transmission unit configured to transmit a rotational driving force generated by the motor to the first pin; and
a housing configured to cover the carousel, wherein
the specimen collection position is above a transport path of the carousel and is located within a predetermined distance from the housing, and
the grip unit waits outside the transport path until the specimen carriers are transported to the specimen collection position, and when the specimen carriers are transported to the specimen collection position, the grip unit moves toward the transport path, and
wherein the rotational driving force transmission unit comprises a connecting plate, a plurality of gears, a first detection plate fixed to a first gear of the plurality of gears, and a plurality of sensors configured to measure a rotation angle of the first gear, a position of the connecting plate, and a position of the first detection plate.

2. The connection device according to claim 1, wherein the analysis device includes a specimen collection unit configured to collect the specimens, and
the predetermined distance is a distance that the specimen collection unit reaches.

3. The connection device according to claim 1, wherein a predetermined number of the specimen containers are retained between a specimen carry-in path into which the specimen carriers are carried and the specimen collection position.

4. The connection device according to claim 3, wherein the predetermined number is equal to a number of openings in a specimen rack in which the plurality of specimen containers are arranged.

5. The connection device according to claim 1, wherein the housing has a shape along an arc-shaped path in the transport path.

6. The connection device according to claim 5, wherein the specimen collection position is above the arc-shaped path.

7. The connection device according to claim 1, wherein a space is provided in at least one of moving directions of the grip unit.

8. An automated system for inspecting a specimen configured to preprocess a specimen container and analyze a specimen, the automated system comprising:
an analysis device configured to analyze the specimen;
a controller configured to control operation of the automated system; and
a connection device configured to connect a specimen transport device configured to transport specimen containers accommodating specimens and the analysis device, wherein the connection device includes:
a carousel configured to transport a plurality of specimen carriers, each on which the specimen container is placed, at a predetermined interval;
a grip unit disposed inside the carousel and configured to grip the specimen containers at a specimen collection position where the specimens are collected, the grip unit including a motor, a pair of clamps, each of which includes a first pin, a second pin and a contact surface configured to contact the specimen containers, and a rotational driving force transmission unit configured to transmit a rotational driving force generated by the motor to the first pin; and
a housing configured to cover the carousel, wherein
the specimen collection position is above a transport path of the carousel and is located within a predetermined distance from the housing, and
the grip unit waits outside the transport path until the specimen carriers are transported to the specimen collection position, and when the specimen carriers are transported to the specimen collection position, the grip unit moves toward the transport path, and wherein the rotational driving force transmission unit comprises a connecting plate, a plurality of gears, a first detection plate fixed to a first gear of the plurality of gears, and a plurality of sensors configured to measure a rotation angle of the first gear, a position of the connecting plate, and a position of the first detection plate.

* * * * *